United States Patent [19]

Sadleir

[11] Patent Number: 5,407,150
[45] Date of Patent: Apr. 18, 1995

[54] THRUST UNIT FOR VTOL AIRCRAFT

[75] Inventor: Kimberley V. Sadleir, Winthrop, Australia

[73] Assignee: Sandleir VTOL Aircraft Co., Ltd., Winthrop, Australia

[21] Appl. No.: 37,118

[22] Filed: Mar. 25, 1993

[30] Foreign Application Priority Data

Jul. 25, 1990 [AU] Australia ............... PK 1347
Apr. 29, 1991 [AU] Australia ............... PK 5886

[51] Int. Cl.⁶ ................. B64C 15/12; B64C 29/00
[52] U.S. Cl. .................. 244/12.4; 244/23 B; 244/23 C; 244/23 D; 244/45 A; 244/73 C
[58] Field of Search ............. 244/7 R, 12.4, 15, 23 R, 244/23 B, 23 C, 23 D, 45 A, 73 R, 73 B, 73 C

[56] References Cited

U.S. PATENT DOCUMENTS

| 2,969,937 | 1/1961 | Trojahn | 244/23 R |
|---|---|---|---|
| 2,973,921 | 3/1961 | Price | 244/23 R |
| 3,123,320 | 3/1964 | Slaughter | 244/23 C |
| 3,387,456 | 6/1968 | Feder et al. | 244/23 B |
| 3,588,006 | 6/1971 | Koeppe | 244/23 R |
| 4,537,372 | 8/1986 | Forizs | 244/12.4 |
| 4,796,836 | 1/1989 | Buchelt | 244/23 R |
| 4,828,203 | 5/1989 | Clifton et al. | 244/45 A |
| 5,064,143 | 11/1991 | Bucher | 244/23 B |
| 5,149,012 | 9/1992 | Valverde | 244/23 C |

FOREIGN PATENT DOCUMENTS

| 246398 | 8/1963 | Australia . | |
| 250107 | 3/1964 | Australia . | |
| 2733463 | 7/1977 | Germany | 244/23 B |
| 834800 | 11/1960 | United Kingdom . | |

Primary Examiner—David A. Bucci
Assistant Examiner—Virna Lissi Ansley
Attorney, Agent, or Firm—Larson and Taylor

[57] ABSTRACT

A thrust unit for an aircraft having a lift unit for propelling the aircraft in upward flight. The lift unit includes a duct for directing air substantially downwardly, the duct being shaped so that air exhausting from its downstream end is in a stream having substantially the same cross-sectional dimension of the duct at the downstream end, and an air pump disposed for inducing a draught of air through the duct. In use, the draught of air exhausting from the duct can produce an upward thrust and is substantially non-convergent.

44 Claims, 22 Drawing Sheets

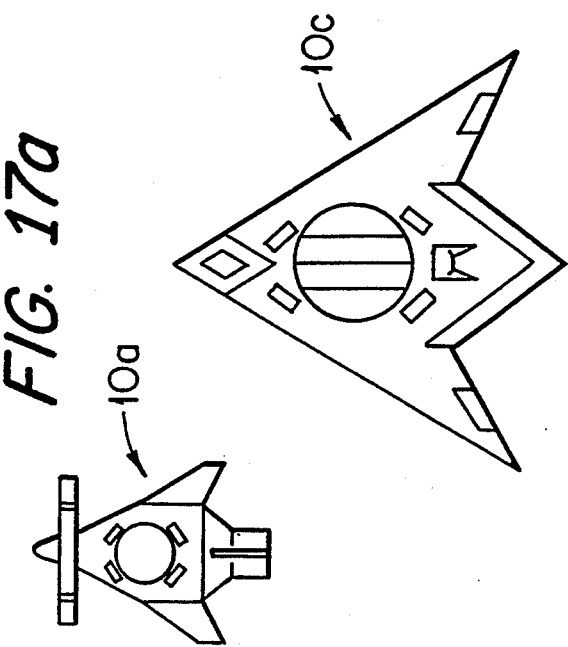
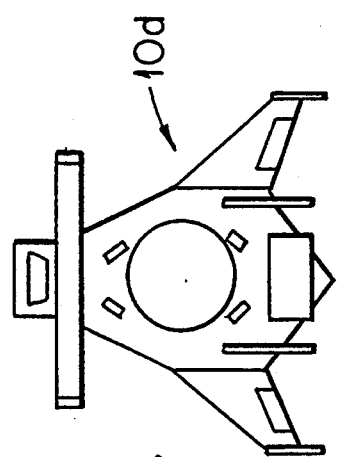
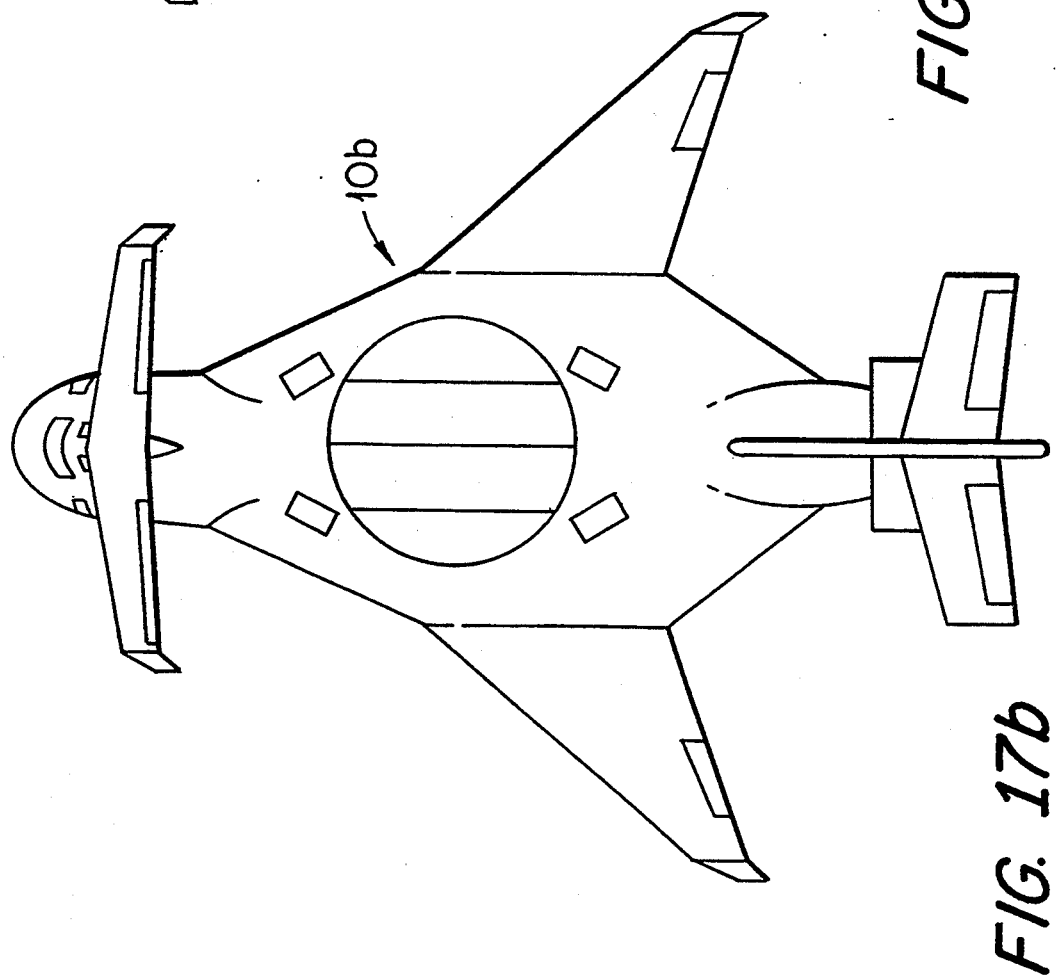

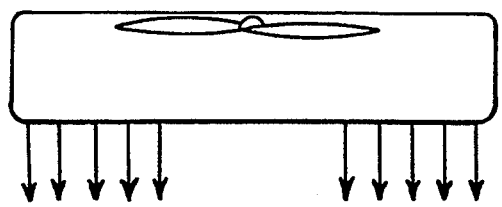
FIG. 23a
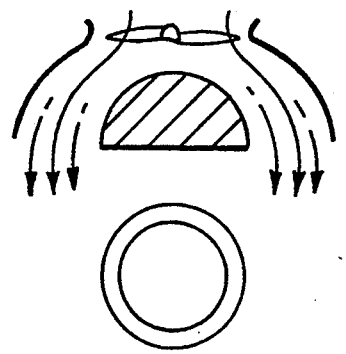
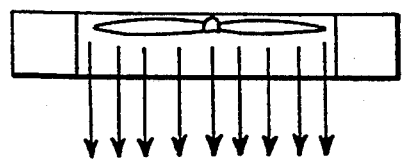
FIG. 23b
FIG. 23c
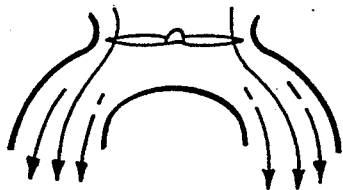
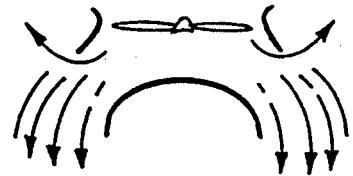
FIG. 23d
FIG. 23e
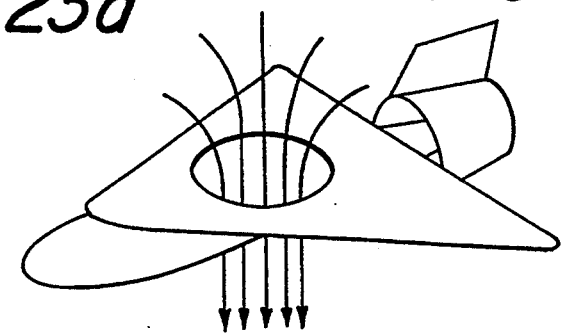
FIG. 23f

THRUST UNIT FOR VTOL AIRCRAFT

FIELD OF INVENTION

The present invention relates to an improved aircraft and a thrust unit therefor. More particularly, the present invention relates to an improved VTOL aircraft (vertical takeoff and landing).

DISCUSSION OF PRIOR ART

It is known to provide VTOL aircraft in the form of helicopters. A disadvantage of helicopters is that the reaction of the rotation of its lift blades requires the use of a tail rotor rotating about a horizontal axis. Loss of function of the tail rotor is generally fatal to the airworthiness of the helicopter. Also, the lift blades must meet very stringent mechanical requirements and require a very complicated system for their drive and control. Also, the speed of the flight of the helicopter is limited to a speed at which the lift blades rotate at the speed of sound. Under these conditions, when the lift blades travel in a direction opposite to the helicopters direction of flight, air over the lift blades stalls and thus lift is lost over half of the helicopter's lift surface. Further, air on the downstream side of the lift blades tends to converge into a cone shape to an area of about half the area defined by the lift blades when in rotation. The air in the cone travels at about twice the speed of air entering upstream of the lift blades. The power required to produce a given amount of vertical thrust is directly proportional to the velocity of the stream of air produced by the rotating lift blades. Thus, the power required for a given amount of vertical thrust doubles due to coning. Consequently, there is a large loss in the efficiency of lift produced by the lift blades due to coning.

It is also known to locate a fan in a wing of an aircraft in order to provide vertical lift. However, in such cases the diameter of the fan is larger than the thickness of the wing and thus there is again produced a coning effect for air downstream of the fan. Coning could be reduced by making the wing thicker or by making the fan smaller. In the former case the wing becomes too thick for efficient forward flight and in the latter case the fan is unable to provide sufficient vertical thrust to raise the aircraft off the ground.

It is also known to locate a horizontally mounted, forward facing jet turbine in an elongate duct and control the flow of air therefrom through a plurality of elongate ducts and out via, say, four nozzles, whereby, the nozzles can be rotated for providing thrust in various directions from vertically downward through to horizontally rearward. Such an aircraft is exemplified by jet aircraft sold under the name HARRIER. Such ducts and nozzles are relatively narrow and the jet turbines must produce exhausting air at extremely high speed and pressure to develop the required amount of thrust for vertical and horizontal flight. A disadvantage of such a system is that the nozzles are designed for efficient high speed forward thrust but are very inefficient in vertical lift mode—accordingly much greater power input is required for vertical lift than would otherwise be the case. A further disadvantage of such systems is that because of the speed and force of the exhausting air, take off and landing pads must be specially prepared so as not to be damaged. Also, a relatively large clearance area must be provided about the aircraft to avoid the exhausted jet air stream overturning objects that are not secured to the ground.

The phenomenon of coning is exemplified in FIG. 20a which shows that the air on the downstream side of a fan F converges to a cross-sectional area which is about half of that at the upstream side of the fan F. Immediately downstream of the fan F there is a relatively high static air pressure created by the fan F. As the air travels downstream that static pressure energy is converted into kinetic energy represented by an increase in the speed of the air. The conversion occurs within a length approximately equal to one diameter of the fan F.

The conversion of static pressure into kinetic energy is shown schematically in FIG. 20b. A line marked S represents the static pressure energy, a line marked K represents the kinetic energy and a line marked T represents the total pressure energy. The total pressure energy rises abruptly after the air passes through the fan F and slowly reduces. The static pressure energy reduces at approach to the fan F, increases rapidly to a maximum after passing through the fan F and reduces to zero in a distance substantially equal to the diameter of the fan F. The kinetic energy increases at approach of the fan F (as air speeds up to enter the fan F), an increases smoothly as the air passes through the fan F and reaches a maximum the same distance that the static pressure energy reduces to zero; thereafter the kinetic energy slowly reduces. The static pressure energy may also be referred to as "pressure head" and the kinetic energy as "velocity head", and the total pressure energy as "total-head".

Coning can be substantially reduced, if not eliminated, by locating the fan in a "suitably designed duct". Typically, to inhibit coning in cylindrical ducts, the duct must be longer than the diameter of the fan. In rectangular cross-section ducts the area of the walls of the ducts is preferably at least about twice the cross-sectional area of the ducts. In such cases the air at the periphery of the fan must remain substantially in contact with the interior walls of the duct since air can not be drawn into the duct through its walls. Air exhausting from such ducts has substantially the same speed over the entire downstream end of the ducts. Accordingly, a substantially equal pressure acts over substantially the entire area of the duct outlets to produce a substantially uniform thrust force. This reduces the power required to provide a given amount of vertical thrust as compared to that for non-ducted fans where coning occurs and the thrust force is not substantially uniform.

When the fan is located in a duct D as shown in FIG. 21a, where the duct is long compared to its width, the air is prevented from coning and the air exhausting from the duct D has a diameter substantially the same as that of the duct D. A pressure energy diagram representing the static S, kinetic K and total T pressure energies is shown in FIG. 21b. Importantly, the kinetic energy is almost at a maximum at entry to the fan F and all of the static pressure energy is converted to kinetic energy within the duct D. Accordingly, an increase in the speed of the air outside of the duct D does not occur and hence coning does not occur.

The ducts may be of various cross-sectional shapes, such as, for example, circular, elliptical, rectangular, triangular or more complex geometric shapes. The cross-sectional shapes have a centroid and a "critical width dimension". In the context of the present invention the "critical width dimension" is defined as the shortest cross-sectional dimension which traverses the duct. The critical width dimension is taken at right angles to the path of air through the duct and is the dimensions that determines, in part, the characteristics of the duct. To avoid the above mentioned coning phenomenon the critical width dimension is preferably less than or equal to the distance travelled by air flowing through the duct (hereinafter referred to as the "air path length"). In the event that the critical width dimension is greater than the air path length coning will be induced. The amount of coning will depend upon the difference between the critical width dimension and the air path length. It is to be understood, however, that the objects of the present invention may be met to an acceptable degree even where the critical width dimension is slightly greater than the air path length—thus producing an acceptably small amount of coning; that is, acceptable in the circumstances.

In the case of a circular cross-section duct the critical width dimension is the diameter of the duct. For a rectangular cross-section duct the critical width dimension is the shortest width dimension of the duct. For a triangular cross-section duct the critical width dimension is shortest distance from any apex of the triangle to its opposite side. For an elliptical cross-section the critical width dimension is the shortest distance across the ellipse.

The problem sought to overcome by the present invention is how to provide such ducts whilst allowing use of a fan of significant area in a relatively thin wing or above a fuselage. We have discovered that, by careful design of the duct, coning can be substantially eliminated, even for relatively short ducts, and the exhausting air can be diverted around the aircraft fuselage. In the former case the duct is provided with a plurality of subducts in its downstream end such that each subduct is relatively long when compared to its width or has walls of sufficiently large area when compared to its cross-sectional area (i.e. such subduct is "suitably designed"). In the latter case a plurality of ducts are connected to an open top chamber which houses the fan. The ducts divert the exhausting air around the fuselage. Typically, four ducts are employed in a rhombus or diamond configuration, when viewed in plan. The air flow in such ducts is shown in FIG. 22a and the air pressure energy distribution is shown in FIG. 22b. Importantly the pressure energy distribution is as favourable as that for the straight duct of FIG. 21a, although with some less at the bends.

The duct of FIG. 22a has the further advantage that swirl generated in the air is recovered and thus more energy is imparted into the air for thrust. Also, since the fan F terminates close to the duct D there is energy recovered from tip losses which occur in the open fan of FIG. 20a. In a well designed ducted fan as compared to an open fan, there is up to 26% energy recovery by non-coning alone, up to 20% energy recovery by removing swirl alone and up to 15% energy recovery by reducing fan tip losses alone—giving a nett energy recovery of about 44% including losses. Thus, the ducted fan is far more efficient that the open fan.

In order to achieve substantially equal vertical thrust from each duct it is essential that each duct have substantially the same internal air resistance (herein referred to as "resistance"). However, to enable effective forward flight the ducts must also be capable of displaying different air resistance—the leading ducts displaying greater resistance and the trailing ducts lesser resistance; else there is a nose-up tendency as the speed of forward flight increases, which tends to prevent the aircraft reaching a speed at which its wings provide sufficient lift to support the weight of the aircraft. In the present invention this is achieved by use of a cowling and by the disposition and shape of the ducts. The foremost most ducts are directed forwardly of the aircraft about the fuselage and the rearmost ducts are directed rearwardly of the aircraft. The effect of this is that in vertical flight each duct has the same resistance since the duct shape, as experienced by incoming air, is identical for each duct. However, in forward flight, whilst using the vertical thrust unit, air entering the front of the thrust unit must traverse a more tortuous route than air entering the rear of the thrust unit. The former thus has a larger resistance and the latter is a lesser resistance—thus overcoming the tendency of the majority of air entering into the front of the thrust unit. Hence, the net result is that air is equally likely to flow from in front of the VTOL aircraft and through either the forward or rearward ducts. Consequently, the nose-up tendency is defeated.

It is therefore desirable to provide a VTOL aircraft which does not require a tail rotor, is of relatively simple construction, and is capable of flying much faster than a helicopter.

In the present invention this can be achieved by providing an air pump for drawing air from above the VTOL aircraft and forcing it out below the aircraft. The air is forced through ducts whose air flow characteristics can be controlled to vary the direction of the air so forced.

SUMMARY OF THE INVENTION

The present invention provides an improved VTOL aircraft having a lift unit for use in vertical flight and horizontal flight.

In accordance with one aspect of the present invention there is provided a thrust unit for an aircraft, the thrust unit having a lift unit for propelling the aircraft in upward flight, the lift unit comprising:
  a duct for directing air substantially downwardly, the duct being shaped so that air exhausting from its downstream end is in a stream having substantially the same cross-sectional dimension as the cross-sectional dimension of the duct at the downstream end; and,
  an air pump disposed for inducing a draught of air through the duct,
  whereby, in use, the draught of air exhausting from the duct can produce upward thrust and whereby the draught of air exhausting from the duct is substantially non-convergent.

The concept of the above statement is exemplified by the thrust unit shown in FIG. 23a.

Substantial equality of air speed at the area of the downstream end of the duct can be achieved where the critical width dimension of the duct is greater than or not significantly less than the air path length for the duct.

The duct is exemplified by a substantially cylindrical duct disposed through a fuselage or wing of the aircraft, the duct having a plurality of sub-ducts for conditioning passage of air through the duct. The sub-ducts being smaller in width than length so that coning of air leaving the sub-ducts is avoided and thus coning of air leaving the duct is avoided. The duct is also exemplified by a chamber attached at its outer periphery to an annular cylinder. The duct is further exemplified by the chamber being attached at its outer periphery to a plurality of lift ducts. The duct is still further exemplified by the chamber being attached at its outer periphery to a plurality of lift ducts and control ducts—the control ducts being either integral with or separate from the lift ducts. Preferably, the mass flow of air through the duct being the same substantially independent of the proportion of the air flowing through each of the lift and control ducts.

In accordance with another aspect of the present invention there is provided a thrust unit for an aircraft, the thrust unit having a lift unit for propelling the aircraft in upward flight, the lift unit comprising:
 a duct for directing air substantially downwardly, the duct being substantially cylindrical so that air passing through the duct is substantially undeflected, and the duct having a plurality of sub-ducts at its downstream end, the sub-ducts being shaped so that air exhausting from their downstream ends is in a stream having substantially the same cross-sectional dimension as the cross-sectional dimension of the sub-ducts at their downstream ends;
 an air pump disposed for inducing a draught of air through the duct;
 whereby, in use, the draught of air exhausting from the duct can produce upward thrust and whereby the draught of air exhausting from each of the sub-ducts is substantially non-convergent.

The concept of the above statement is exemplified by the thrust unit shown in FIG. 23b.

Preferably, the sub-ducts are formed by a plurality of baffles disposed substantially parallel to the flow of air through the duct. The baffles may be disposed to form a plurality of concentric annular cylinders or a plurality of parallelepipeds.

In accordance with another aspect of the present invention there is provided a thrust unit for an aircraft, the thrust unit having a lift unit for propelling the aircraft in upward flight, the lift unit comprising;
 a duct for directing air substantially downwardly, the duct having a chamber attached at its outer periphery to an annular cylinder; and,
 an air pump disposed for inducing a draught of air through the duct,
 whereby, in use, the draught of air exhausting from the duct can produce upward thrust and whereby the draught of air exhausting from the duct is annular in cross section and is substantially non-convergent.

The concept of the above statement is exemplified by the thrust unit shown in FIG. 23c.

In accordance with another aspect of the present invention there is provided a thrust unit for an aircraft, the thrust unit having a lift unit for propelling the aircraft in upward flight, the lift unit comprising:
 a duct for directing air substantially downwardly, the duct having a chamber attached at its outer periphery to a plurality of lift ducts, each lift duct exhausting downwardly; and
 an air pump disposed for inducing a draught of air through the each of the lift ducts,
 whereby, in use, the draught of air exhausting from the lift ducts can produce upward thrust and whereby the draught of air exhausting from each of the lift ducts is substantially non-convergent.

The concept of the above statement is exemplified by the thrust unit shown in FIG. 23d.

Typically, each lift duct is disposed outwardly and downwardly from the chamber. Also, typically the lift ducts are disposed downwardly from each other.

Preferably, control ducts are provided for directing air upwardly for further controlling the thrust developed by the lift unit. Typically, the control ducts include a subduct disposed for directing air downwardly.

In accordance with another aspect of the present invention there is provided a thrust unit for an aircraft, the thrust unit having a lift unit for propelling the aircraft in upward flight, the lift unit comprising:
 a duct for directing air substantially downwardly, the duct having a chamber attached at its outer periphery to a plurality of lift ducts, and the duct also having a plurality of control ducts, the lift ducts exhausting substantially downwardly and the control ducts exhausting substantially upwardly;
 an air pump disposed for inducing a draught of air through each of the lift ducts and the control ducts;
 valve means for controlling the draught of air through the control ducts,
 whereby, in use, the draught of air exhausting from each of the lift ducts can produce upward thrust and is substantially non-convergent and whereby the mass of air flowing through the duct is substantially independent of the operation of the valve means.

The concept of the above statement is exemplified by the thus unit shown in FIG. 23c.

The control ducts may be separate from or integral with the lift ducts. In the former case each control duct has one outlet exhausting upwardly and one outlet exhausting downwardly and the mass of air flowing through the control duct is independent of the position of the valve means. Also, in such a case preferably, the air resistance of the control ducts is constant whilst controlling the altitude of the aircraft. In the latter case the valve means directly control proportioning of the draught of air between the control ducts and lift ducts.

Preferably, the air pump is also disposed for directing air substantially radially outwardly and downwardly into the lift and control ducts (except in the case of the cylindrical duct in which the air pump is disposed for directing air substantially downwardly only).

Typically, the air pump is a low pressure vertical axis fan housed in a fan chamber having an open top, and the lift and control ducts extending radially outwardly from the fan chamber. Preferably, the fan has a fine pitch, is relatively large, operates at relatively low speed, develops relatively high thrust and relatively slow air speed, and is of relatively low solidity.

Preferably, the fan chamber has a cowling disposed upwardly from its periphery.

Preferably, the lift ducts have exhaust vanes, at their outlets for directly the exhausting air.

Preferably, the air resistance from a given location, above the lift unit, to the downstream ends of the lift ducts is substantially the same.

Preferably, the thrust unit also includes a propulsion unit, typically, in the form of a horizontally disposed fan located in a duct. Preferably, the fan has a course pitch, is relatively small, operates at relatively high speed, develops relatively low thrust and relatively high air speed, and is of relatively low solidity.

Preferably, the forward thrust developed by the lift unit and the propulsion unit is substantially the same during transition from flight with the lift unit only to flight with the propulsion unit only.

In the context of the present invention "low speed" is considered to include any speed less than a "transition speed" at which the lift unit ceases to be required for creating lift in forward flight. "High speed" is considered to include any speed above the transition speed, thus representing any speed at which only the propulsion unit is required for creating such lift.

In accordance with yet another aspect of the present intention there is provided an improved aircraft having a thrust unit having a lift unit for propelling the aircraft in upward flight, the lift unit comprising:

a duct for directing air substantially downwardly, the duct being shaped so that air exhausting from its downstream end is substantially at the same speed over the area of the downstream end; and an air pump disposed for inducing a draught of air through the duct;

whereby, in use, the draught of air exhausting from the duct can produce upward thrust for the aircraft and whereby the draught of air exhausting from the duct is substantially non-convergent.

The concept of the above statement is exemplified by the improved aircraft shown in FIG. 23f.

The thrust unit may typically be as defined hereinabove.

The aircraft is exemplified by an aircraft having control surfaces and a thrust unit but no lift surfaces. Such an aircraft is capable of vertical flight and hover and may serve as an observation platform or as a crane or lifting apparatus. The aircraft has the special advantage that it can work in very confined spaces, such as, for example, around and between buildings or trees or the like. The aircraft is also exemplified by a winged aircraft having lift surfaces and control surfaces and a lift unit located either about its fuselage or by a similar aircraft having the lift unit location in two of its main lift generating wings. Where the thrust unit is located in the wings the duct of the lift unit is preferably substantially cylindrical in shape.

Preferably, the centre of lift of the duct or the combination of ducts coincides substantially vertically with the centre of lift of the wings and the centre of gravity of the aircraft.

Preferably, the lift unit is capable of propelling the aircraft in vertical flight and low speed forward flight.

Preferably, the thrust unit also includes a propulsion unit. Preferably, the propulsion unit is capable of propelling the aircraft in higher speed forward flight.

BRIEF DESCRIPTION OF THE DRAWINGS

One embodiment, being an example only, of the present invention will now be described with reference to the accompanying drawings, in which:

FIGS. 17a to 17d are plan views of various VTOL aircraft embodying the thrust unit of the VTOL aircraft of FIG. 1;

FIGS. 23A–23F are diagrams showing the various configurations which direct air substantially downwardly according to the present invention.

DESCRIPTION OF PREFERRED EMBODIMENTS

Figure 1:
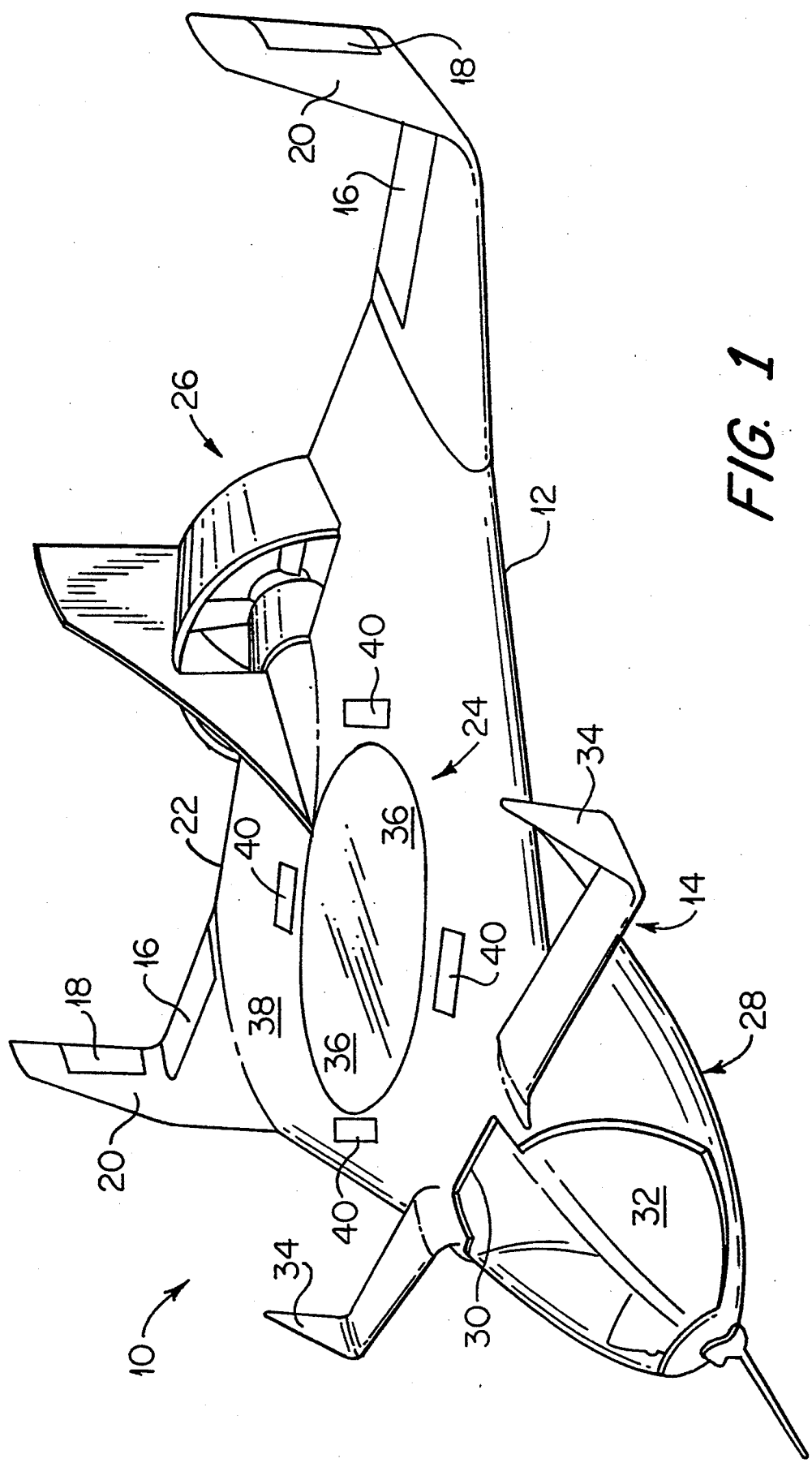
FIG. 1 is a perspective view, seen from above, of a VTOL aircraft incorporating a thrust unit, the VTOL aircraft being shown in "forward flight" mode.
Figure 3:
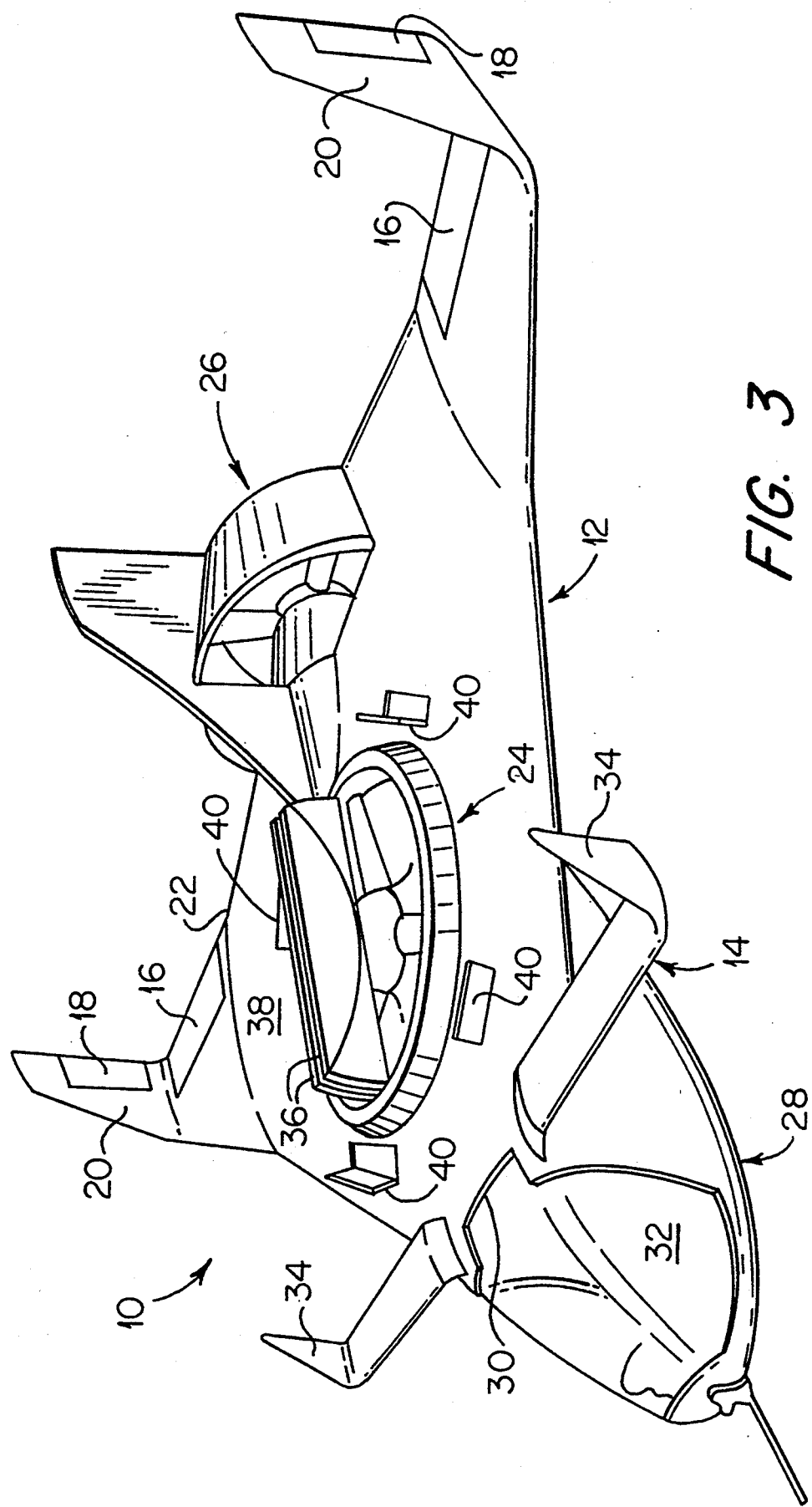
FIG. 3 is a perspective view, seen from above, of the VTOL aircraft of FIG. 1, shown with the thrust unit in "vertical flight mode" and "transition mode"
Figure 4:
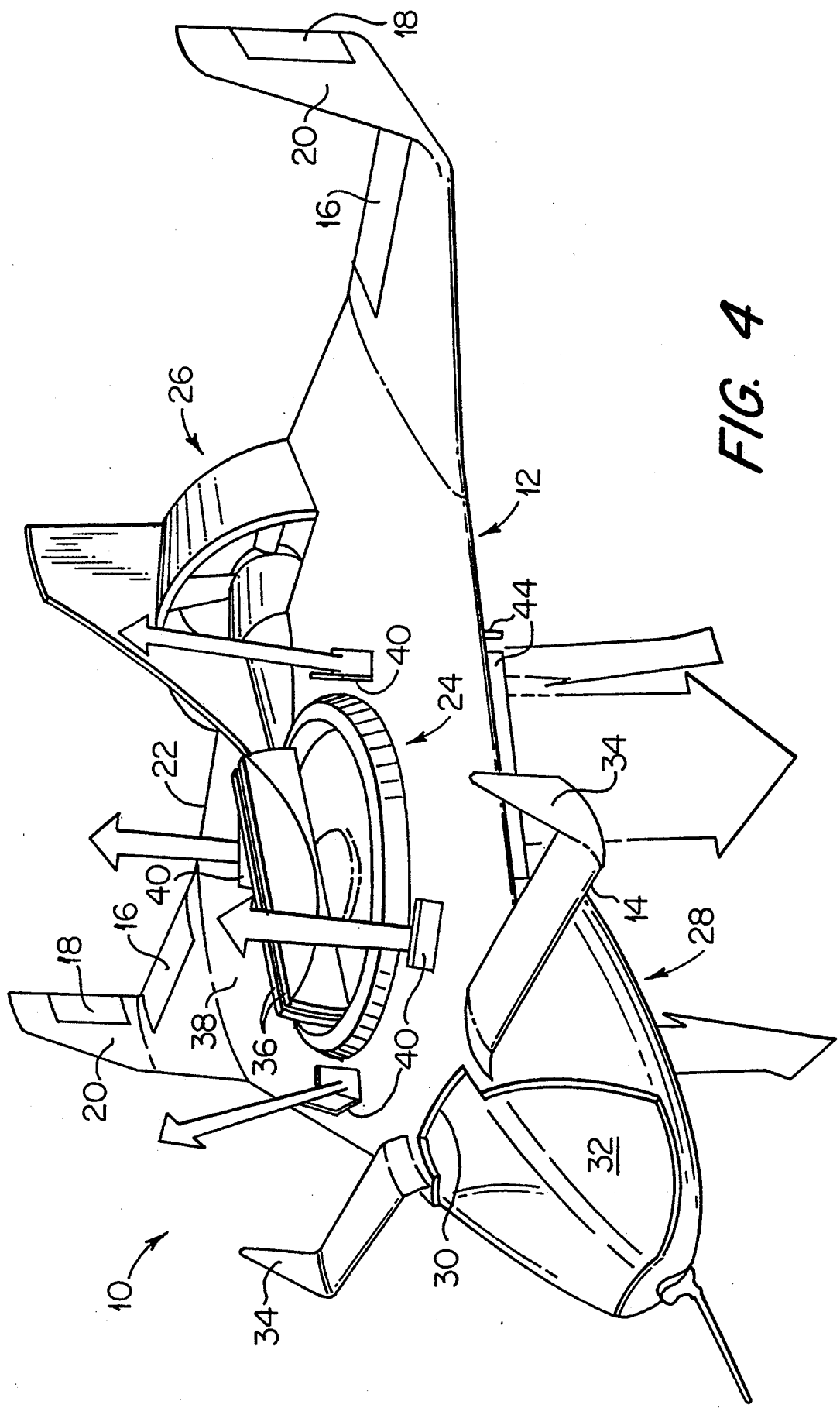
FIG. 4 is a perspective view, seen from above, of the VTOL aircraft of GI. 3, shown with visual representation of the relative volumes of air directed upwardly and downwardly when in "vertical flight" mode.
Figure 5:
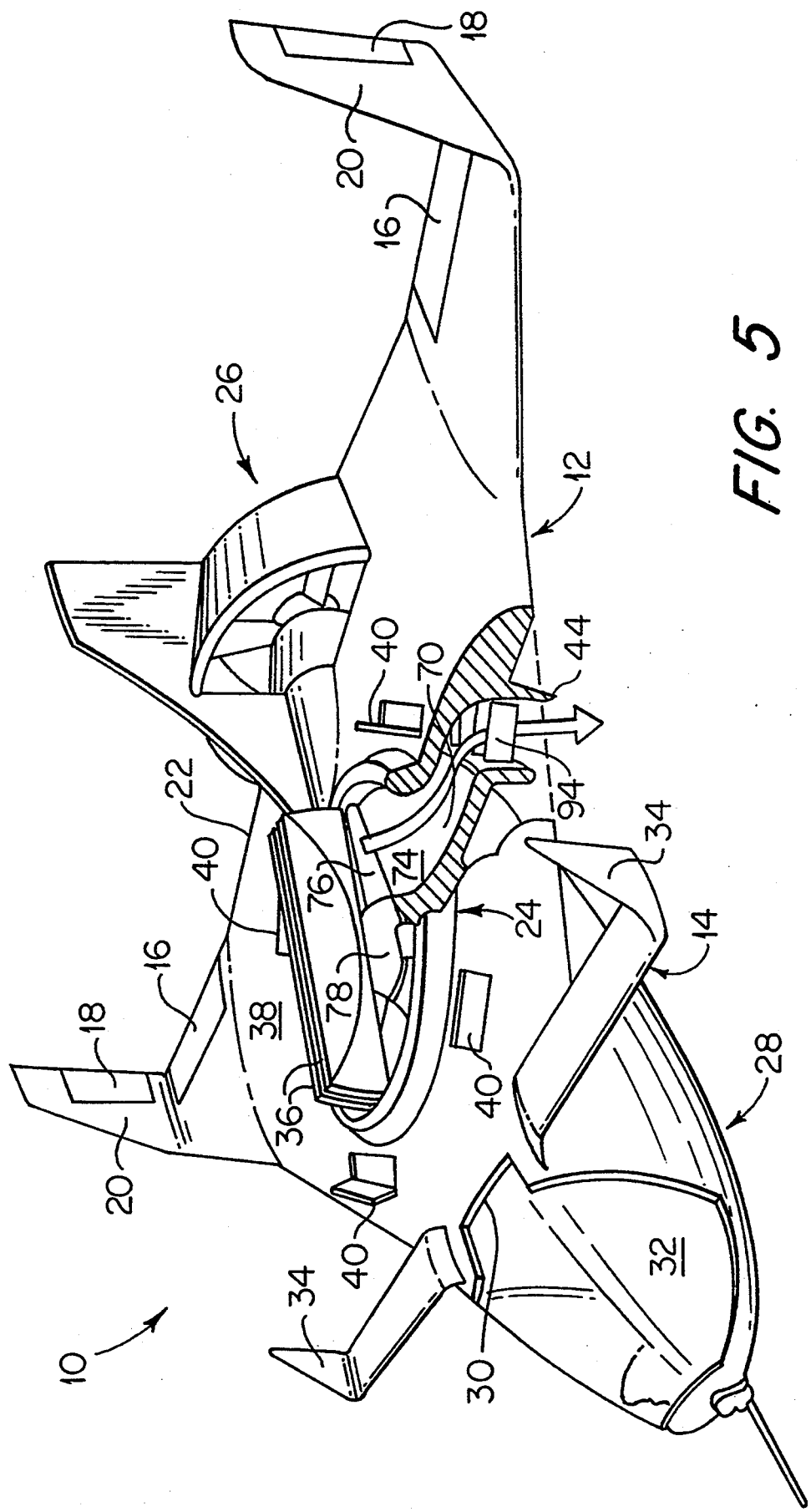
FIG. 5 is a perspective view, seen from above, of the VTOL aircraft of FIGS. 3 and 4, shown partly cut away to reveal one of its lift ducts.
Figure 6:
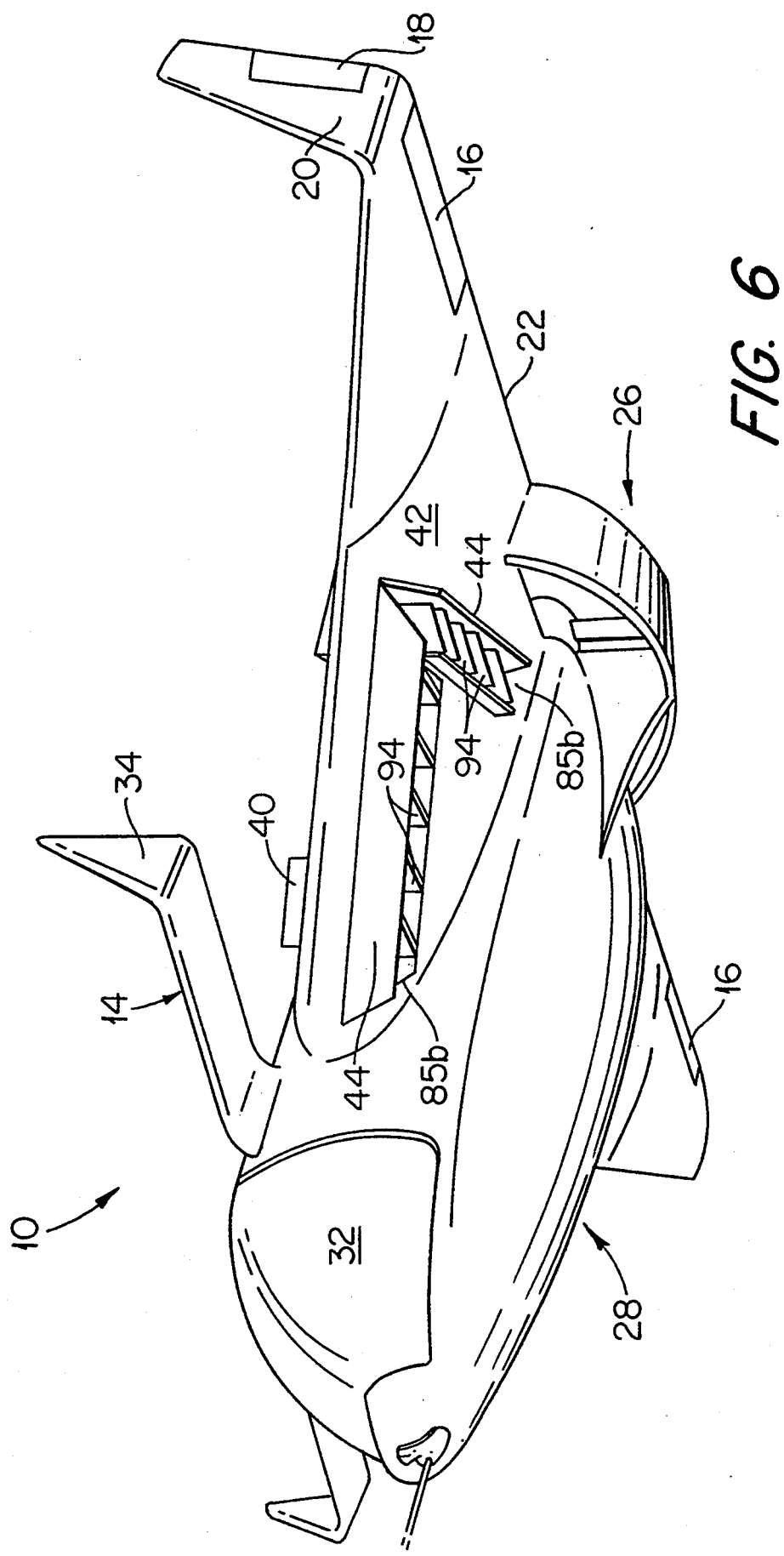
FIG. 6 is a perspective view, seen from below, of the VTOL aircraft of FIG. 1.
Figure 8:
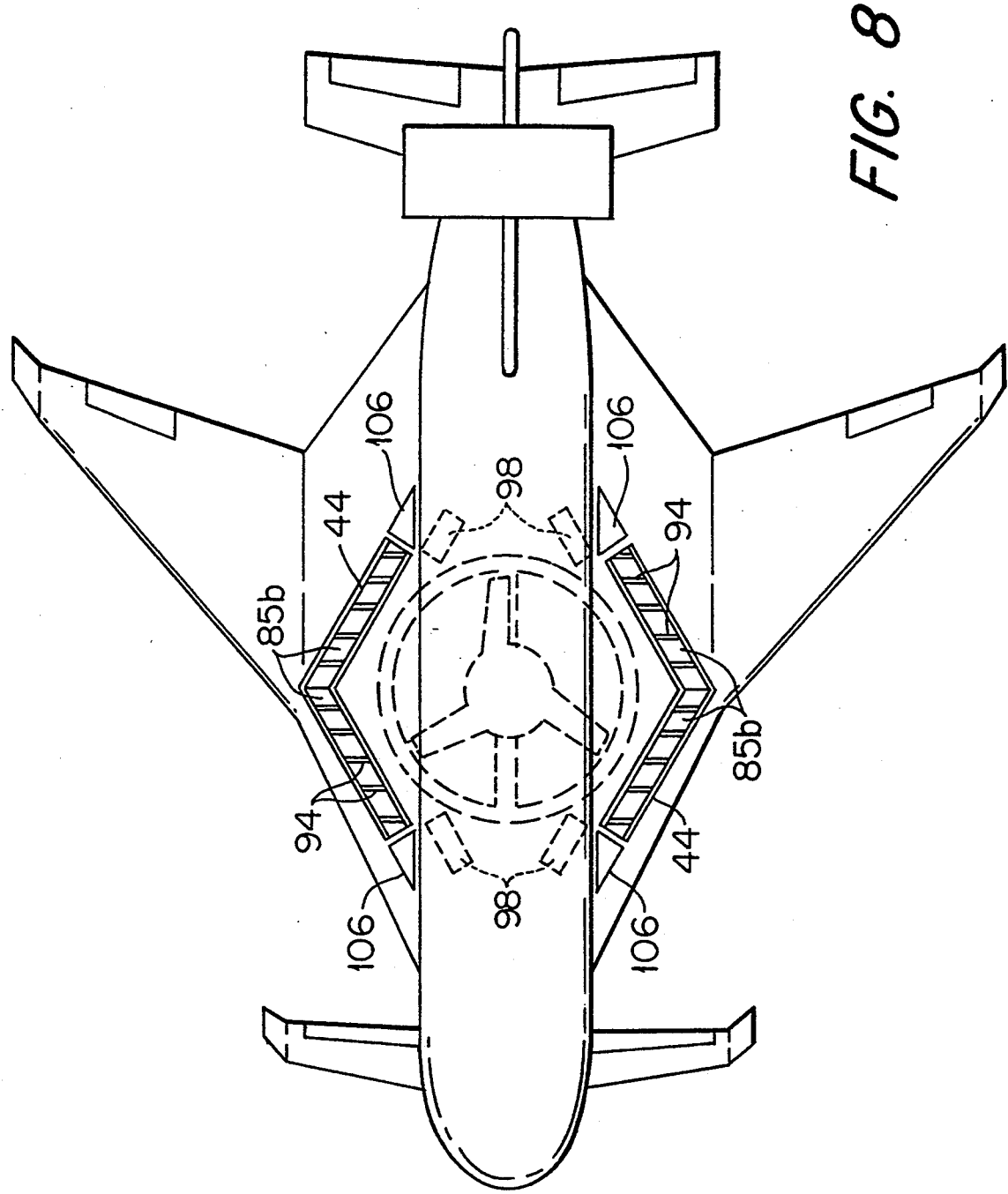

Shown in FIGS. 1 and 3 to 6 is a VTOL aircraft 10 comprising two lift surfaces in the form of a delta wing 12 and a canard wing 14, a plurality of control surfaces in the form of two elevators 16 located on the delta wing 12 and two ailerons 18 located on two rudders 20 spaced across a trailing edge 22 of the delta 12, a lift unit 24, a propulsion unit 26 and a fuselage 28. The canard wing 14 is located proximate a leading end 30 of the delta wing 12. The fuselage 28 is disposed below the delta wing 12 and has a cockpit 32 disposed forwardly of the canard wing 14. Typically, the canard wing 14 has upwardly disposed fins 34 located at its free ends. The delta wing 12 has two gull wing louvres 36 disposed for hinging parallel to the length of the fuselage 28 for closing off an upper surface 38 of the delta wing 12. The delta wing 12 also has a plurality of control duct louvres 40 disposed for closing off outlets of control ducts (described hereinafter). The control duct louvres 40 are also located upon the upper surface 38 of the delta wing 12. Particularly as shown in FIGS. 6 and 8 a lower surface 42 of the delta wing 12 is provided with a plurality of further lift duct louvres 44 for closing off another end of said lift ducts. In a mode of flight referred to as "forward flight mode" the gull wing louvres 36, the control duct louvres 40 and the lift duct louvres 44 are all set to a closed position as shown in FIG. 1. In two other modes of flight referred to as "vertical flight mode" and "transition mode" the gull wing louvres 36, the control duct louvres 40 and the lift duct louvres 44 are all set to an open position, particularly as shown in FIGS. 3 and 6.

Figure 2:
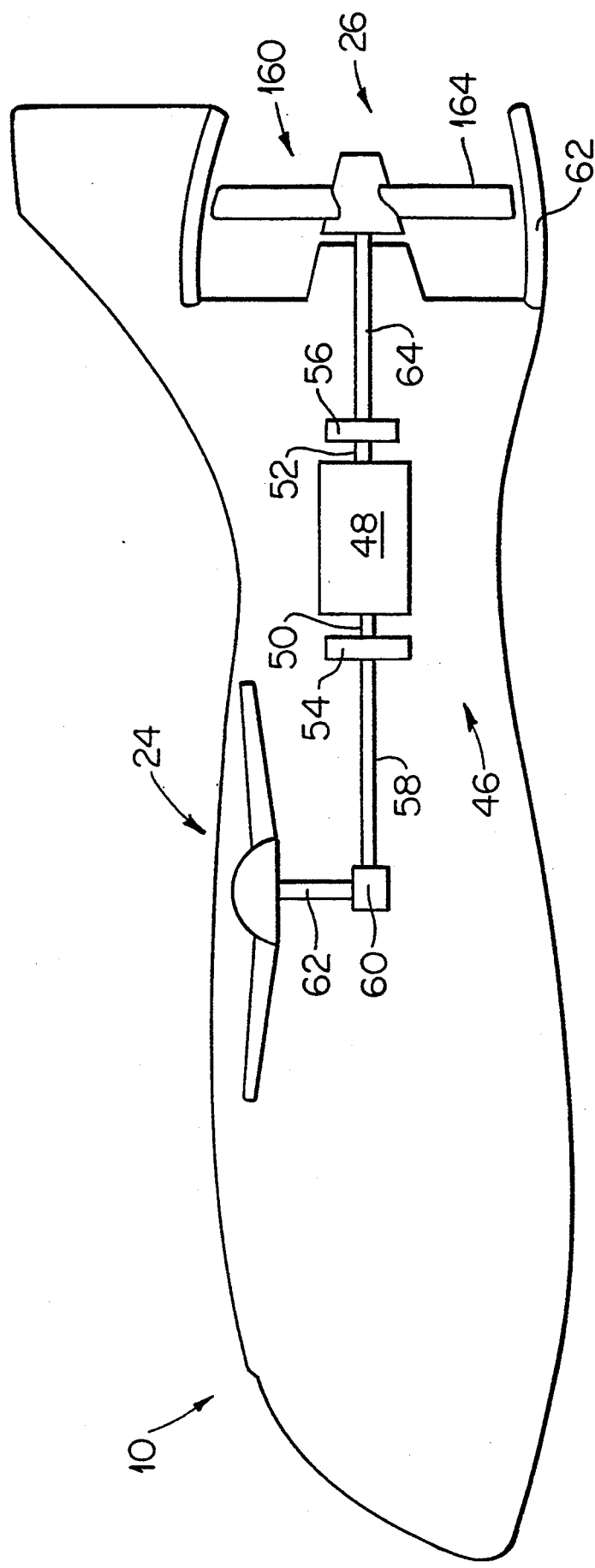
FIG. 2 is a cross sectional view of the VTOL aircraft of FIG. 1, taken along the length of a fuselage of the VTOL aircraft

As shown schematically in FIG. 2 the VTOL aircraft 10 also includes a power unit 46 comprising an engine 48 having two output shafts 50 and 52 connected to two clutches 54 and 56 respectively. An output side of the clutch 54 is attached to a drive shaft 58 which terminates at a right angle drive 60 which is coupled to a drive axle 62 for driving the lift unit 24. An output side of the clutch 56 is attached to a drive shaft 64 for driving the propulsion unit 26.

Figure 9:
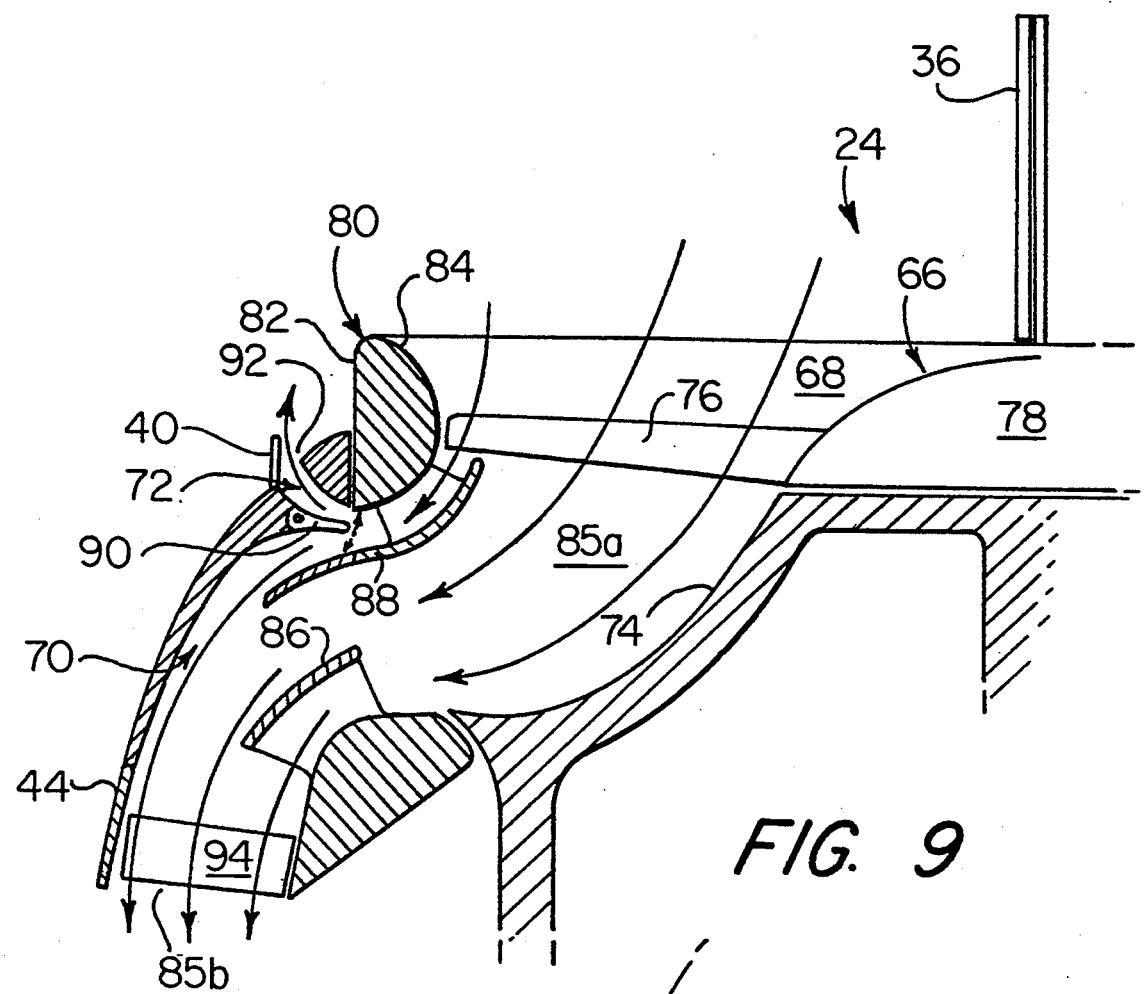
FIGS. 9 and 10 are part cross sectional views of a lift unit of the thrust units of FIGS. 3 and 1, respectively.
Figure 10:
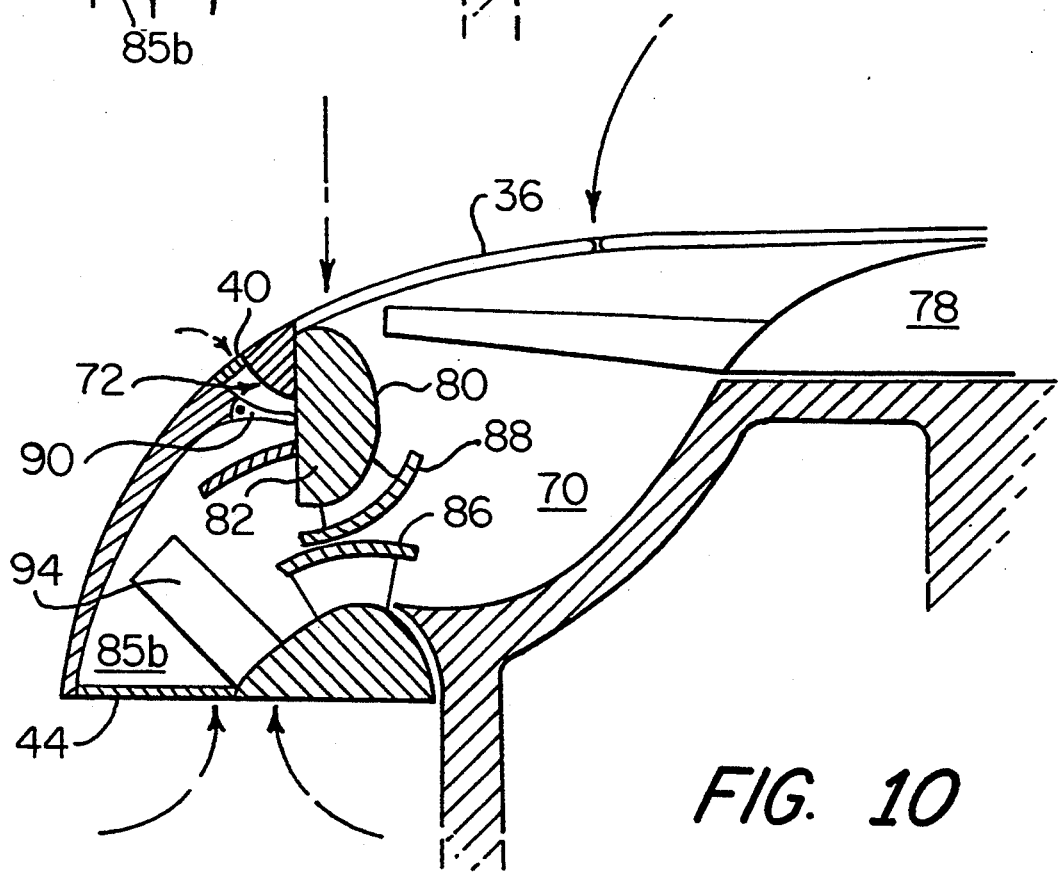

As shown in FIG. 9 the lift unit 24 has a lift fan 66 located in a fan chamber 68 connected to four lift ducts 70 and four control ducts 72. Preferably, the lift fan 66 is a low pressure fan having its axis disposed vertically. Preferably, the fan also has a fine pitch, is relatively large, operates at relatively low speed, develops relatively high thrust and relatively low air speed, and is of low solidity. The fan chamber 68 has an open top which may be closed off by the top gull wing louvres 36 to complete the upper surface 38 of the delta wing 12. The fan chamber 68 has an arcuate base 74 leading smoothly into the lift ducts 70. Typically, the lift fan 66 has three blades 76 which are disposed outwardly from a central hub 78. The central hub 78 is fixed to the drive axle 62 for rotation therewith. The blades 72 are disposed at an angle of approximately three degrees to the horizontal from the central hub 78. Angling of the blades 76 in this manner is preferred so that the resultant of the forces acting on the blades 76 due to the weight of the VTOL aircraft 10 and the centrifugal force due to the rotation of the lift fan 66, acts through each of the blades 76. Hence, the blades 76 operate in pure tension and there is no bending moments at the junction between the blades 76 and the central hub 78. Accordingly, the structural requirements for the fabrication of the lift fan 66 diverted from said flow. The diverted air is directed to an outlet 91 of the control duct 72 disposed upwardly at the louvre 40. The remainder of the air is allowed to continue through the lift duct 70. As shown in FIG. 10 the cowling 80 can be retracted into the lift unit 24 when in the forward flight mode.

It is important to note that the shape of the lift ducts 70 and control ducts 72 can drastically affect their performance. In particular, the nature of the inlet, any bends and the outlet requires special attention. A tapering inlet, such as provided by the cowling 80, is advantageous in reducing intake losses in air flow. The height of the cowling 80 also affects this loss. The bends are preferably smoothly curved for efficient passage of air and deflecting vanes are generally located in the bends to assist such passage by reducing turbulence at the bend and separation of air from the bend. The distance between successive bends also has a significant effect on the overall loss of the duct. In particular, the overall loss of two "closely spaced", well radiused, bends is less than the sum of their separate losses—thus having a favourable effect on the overall loss. "Closely spaced" means that the distance between the bends is typically less than about 5 times the effective width of the duct. The careful design of the duct leads to a siphon effect for air passing through the duct.

The provision of an outlet duct portion and diffusers at the outlets is also important in maintaining the advantages achieved in the design of the bends. The outlet duct portion recovers the dynamic pressure increase produced at the last bend. Without the outlet duct portion spectacular losses may occur at the last bend. The diffuser increases the area of the outlet and further enhances the recovery of static pressure. The amount of diffusion achievable is however limited to the amount of flaring of the outlet that will cause separation of the exhausting air from the wall of the duct at the outlet.

The outlet 85b of each lift duct 70 is provided with a plurality of exhaust deflecting vanes 94 particularly as are greatly reduced and the lift fan 66 may be formed of relatively light-weight materials. It is envisaged that the angle of rise above the horizontal of the blades 76 may be set between one degree and ten degrees depending upon the size of the VTOL aircraft 10, and the centrifugal force due to the rotation of the lift fan 66. The blades 76 are shaped so that their centre of lift and centre of mass coincide thus preventing generation of a twisting movement across the blades 76.

The lift unit 26 also has a cowling 80 (see FIG. 9) disposed about an upper periphery of the fan chamber 68. Preferably, the cowling 80 has a substantially vertical outer face 82 and a curved inner face 84. We have discovered that increasing the height of the cowling 80 increases the smoothness of air flow into the forward most lift ducts 70 when in the transition mode. The shape of the curved inner face 84 is also important in assisting flow of the air into the lift ducts 70. The curved inner surface 84 tapers inwardly from a junction with the vertical outer surface 82 to a point at which the cowling 80 has maximum cross-sectional area and thereafter the curved inner face 84 flares outwardly again until it again meets the vertical outer face 82 at its lower end.

Figure 7:
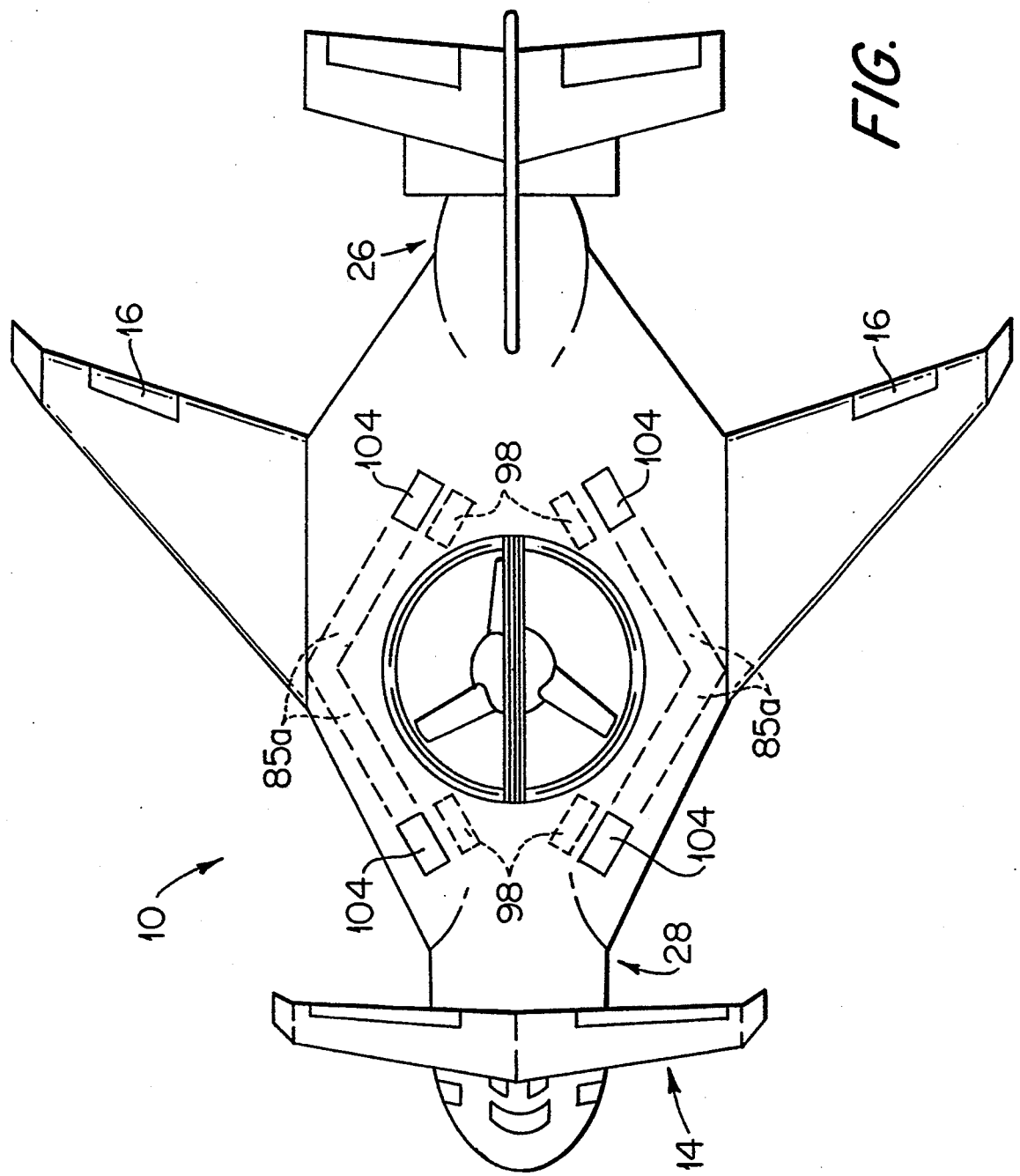
FIGS. 7 and 8 are respectively upper and lower plan views of the VTOL aircraft of FIG. 17b showing inlets and outlets of the lift and control ducts.

The lift ducts 70 are substantially "S" shaped when viewed in longitudinal section as shown in FIG. 9, and are substantially rectangular when viewed from their air inlets 85a and outlets 85b (see FIGS. 7 and 8). The shape of the lift ducts 70 is important in enhancing the efficiency of pumping air through them by reducing turbulence and inducing suction. To this end air deflecting vanes 86 and 88 are provided in the bends in the S shape for reducing air separation which otherwise would occur at the boundary of the lift ducts 70 thereat.

In the embodiment shown in FIG. 9, the deflecting vane 88 also acts to define the control duct 72. The control duct 72 has a diverter 90 directed upstream between the cowling 80 and the deflecting vane 88. Preferably, the angle of the diverter 90 may be altered so as to alter the amount of air shown in FIGS. 7, 9 and 10. The exhaust deflecting vanes 94 are disposed across the relatively small depth of the lift ducts 70 and pivotably coupled into the lift ducts 70. The exhaust deflecting vanes 94 control the direction of flow of air exhausting from each of the lift ducts 70. Independent control of the angle of the exhaust deflecting vanes 94, in respective lift ducts 70, is thus able to effect yaw, pitch and roll control over the VTOL aircraft 10. For example, yaw control can be effected, for the aircraft 10 of FIG. 7, by directing air exhausted from the port side lift ducts 70 in one direction, either forwardly or backwardly, and air exhausted from the starboard side lift ducts 70 in the opposite direction. Upward pitch control can be effected by directing the air exhausted from the forward lift ducts 70 downwardly and the air exhausted from the rearward lift ducts 70—this also produces some forward propulsion. Downward pitch control is effected in reverse manner. Roll control can be effected by directing the air exhausted from the port side lift ducts 70 by equal amounts in opposite directions parallel to the longitudinal extent of the aircraft 10 and the starboard side lift ducts 70 by equal amounts in said opposite directions, where the amount of directing of the air on the port side is different to that of the starboard side. Typically, the air exhausting from the lift ducts 70 of one side directed substantially downwardly for providing maximum lift for that side of the aircraft. Lift control can also be effected, without the need for control ducts (described hereinafter) by directing the air exhausting from the forward lift ducts 70 outwardly equal and opposite amounts to the rearward lift ducts 70, or alternatively directing the air exhausting from the port lift ducts 70 outwardly equal and opposite amounts to the starboard lift ducts 70. Vertical lift is then provided by the vertical component of the downwardly directed air, thus the angle of direction controls the lift.

As shown in FIG. 10 the outlet 85b and the exhaust deflecting vanes 94 may be pivoted inside the lift unit 22 when in the forward flight mode.

The provision of independent lift ducts 70 has the advantage that the swirl component of the air exhausting from the fan 66 is recovered and used to create further thrust. Up to about 15% of the energy imparted to the air by the fan 66 is absorbed into creating swirl. Also, the recovery is more pronounced for blades of greater pitch—which induce greater swirl.

Figure 11:
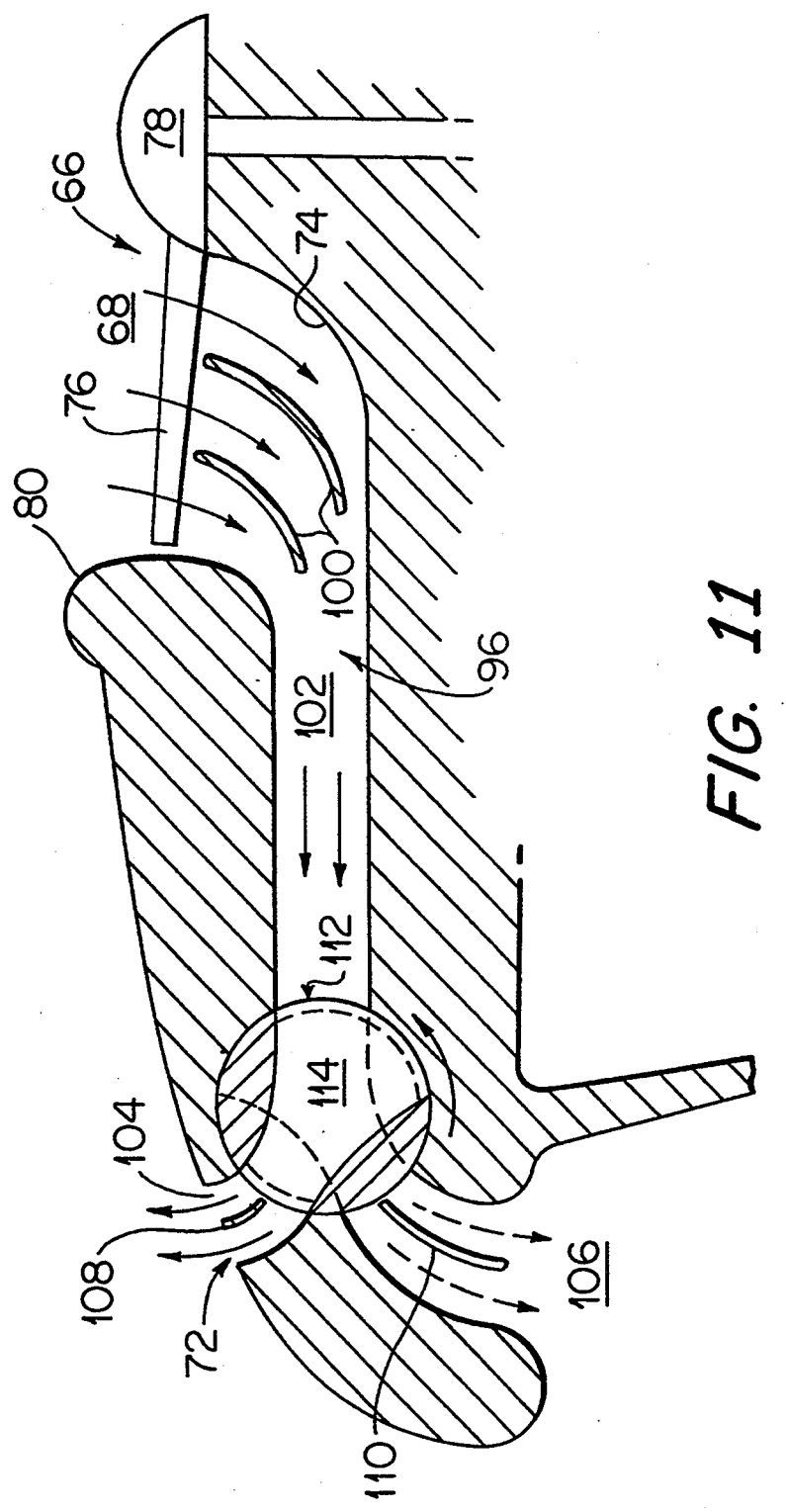
FIG. 11 is a cross sectional view of a control duct according to another embodiment.

In FIG. 11 there is another embodiment of a control duct 96 which is separate from the lift duct 70. The control duct 96 has an inlet 98 having a plurality of deflecting vanes 100 for directing air from the arcuate base 74 of the fan chamber 68 into a conduit 102 which communicates with an upwardly disposed outlet 104 and a downwardly disposed outlet 106, each of which have further deflecting vanes 108 and 110 respectively. A valve means in the form of a rotary splitter 112 is disposed at the end of the conduit 102. The rotary splitter 112 has a bore 114 which is substantially rectangular in cross-section and tapers from an upstream end towards an interior of the rotary splitters 112 and then flares slightly towards a downstream end orientable toward the outlets 104 and 106. Preferably, the amount of the tapering exceeds the amount of the flaring such that the cross-sectional area of the upstream end of the rotary splitter 112 is greater than the cross-sectional area of the downstream end of the rotary splitter 112. The variation in the air path through the rotary splitter 112 is preferred so as to allow rotational stability of the rotary splitter 112 via a castering type effect. The rotary splitter 112 can be rotated for controlling the amount of air which is directed into either or both of the outlets 104 and 106, however, the mass of air remains substantially constant.

Figure 12:
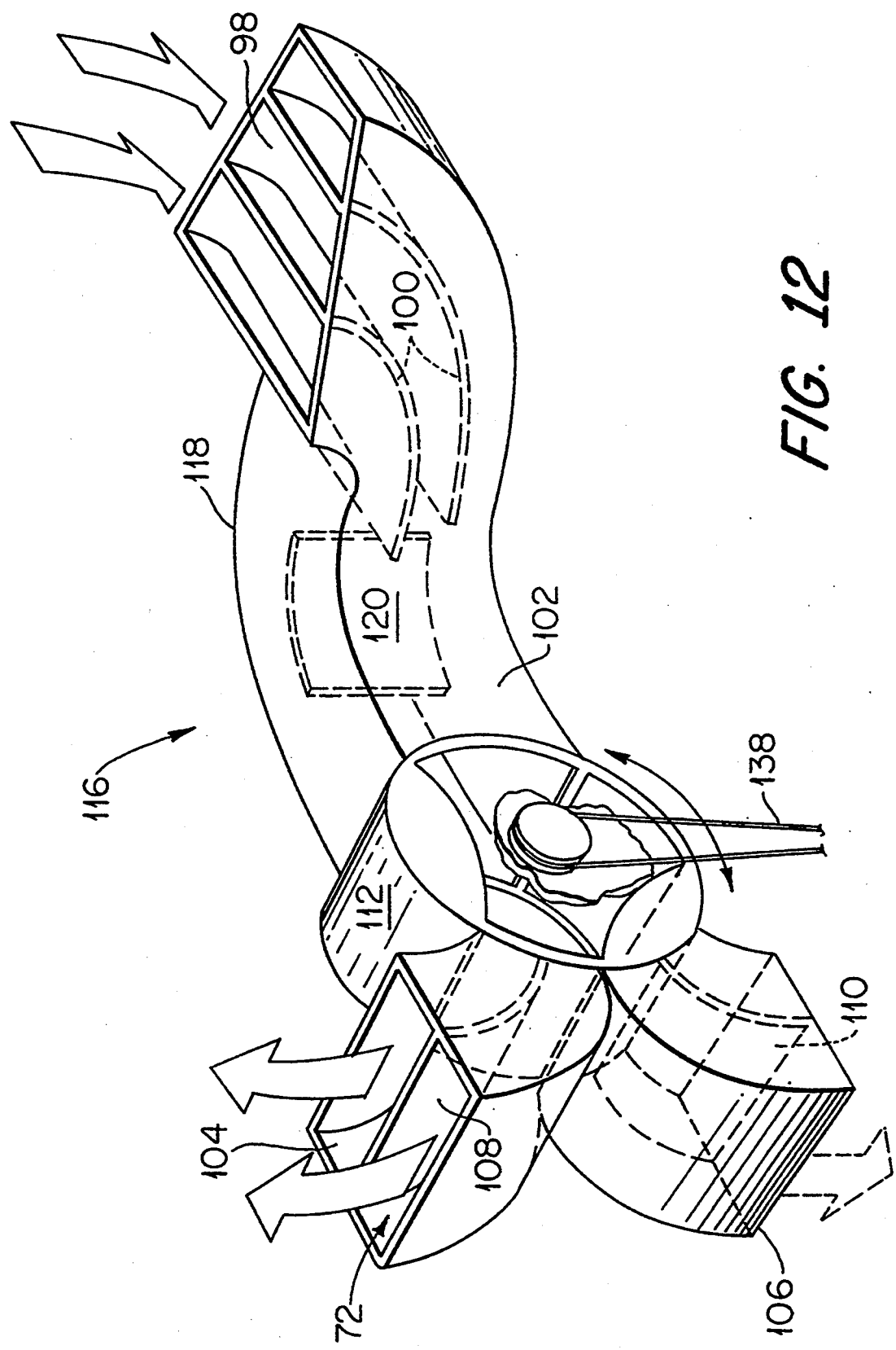
FIG. 12 is a perspective view, seen from above, of yet another embodiment of a control duct.

In FIG. 12 there is shown another embodiment of a control duct 116 similar to the control duct 96 and like numerals denote like parts. The control duct 116 has a further bend 118 in which is stationed a deflecting vane 120.

Figure 13:
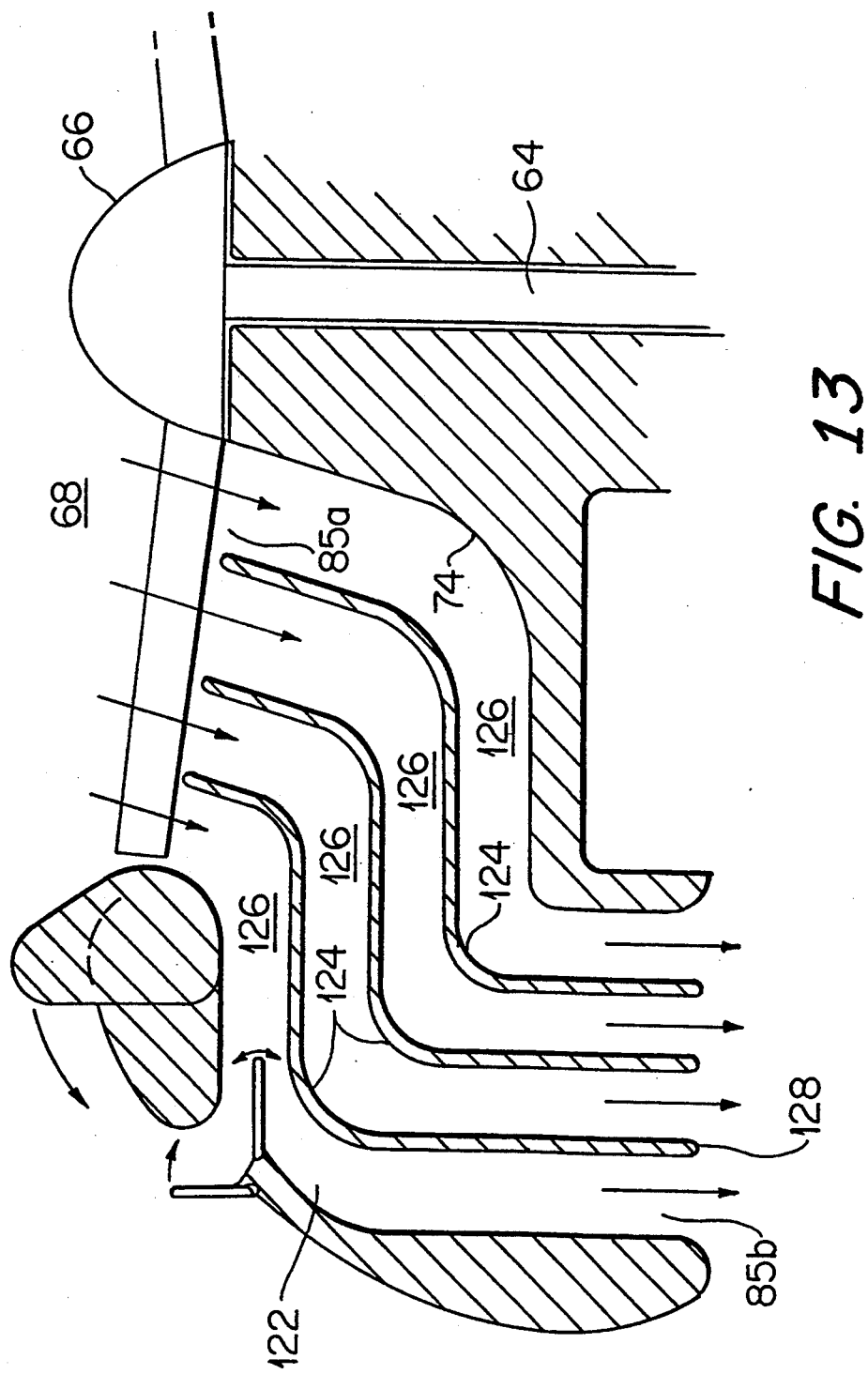
FIG. 13 is a part cross-sectional view of another embodiment a lift duct, having a plurality of parallel sub-ducts.

In FIG. 13 there is shown another embodiment of a lift duct 122 similar in shape to the lift duct 70 except that the lift duct 122 has a plurality of parallel baffles 124 extending the entire length of the lift duct 122 so as to effectively produce a plurality of subducts 126. Preferably, the baffles 124 are arranged so that the air resistance of each of the subducts 126 is substantially the same. The efficiency of the duct 122 is thus no longer dependent upon the overall geometry of the duct 122 but dependent upon the geometry of the individual subducts 126. The aspect ratio of the subducts 126 is much greater than the aspect ratio of the duct 122. This has the effect that the subducts 126 may be designed to be relatively efficient for a given size of the duct 122, whereas the duct 122 with the baffles 124 removed, is of a relatively low efficiency. By this technique a relatively efficient duct 122 can be made in a relatively thin section of the VTOL aircraft 10. Preferably, a diffuser 128 is arranged at the outlet 92 of the duct 122 for increasing the static pressure of air exhausting from the duct 122. The diffuser 128 increases the area of the outlet 85b of the duct 122.

Figure 14:
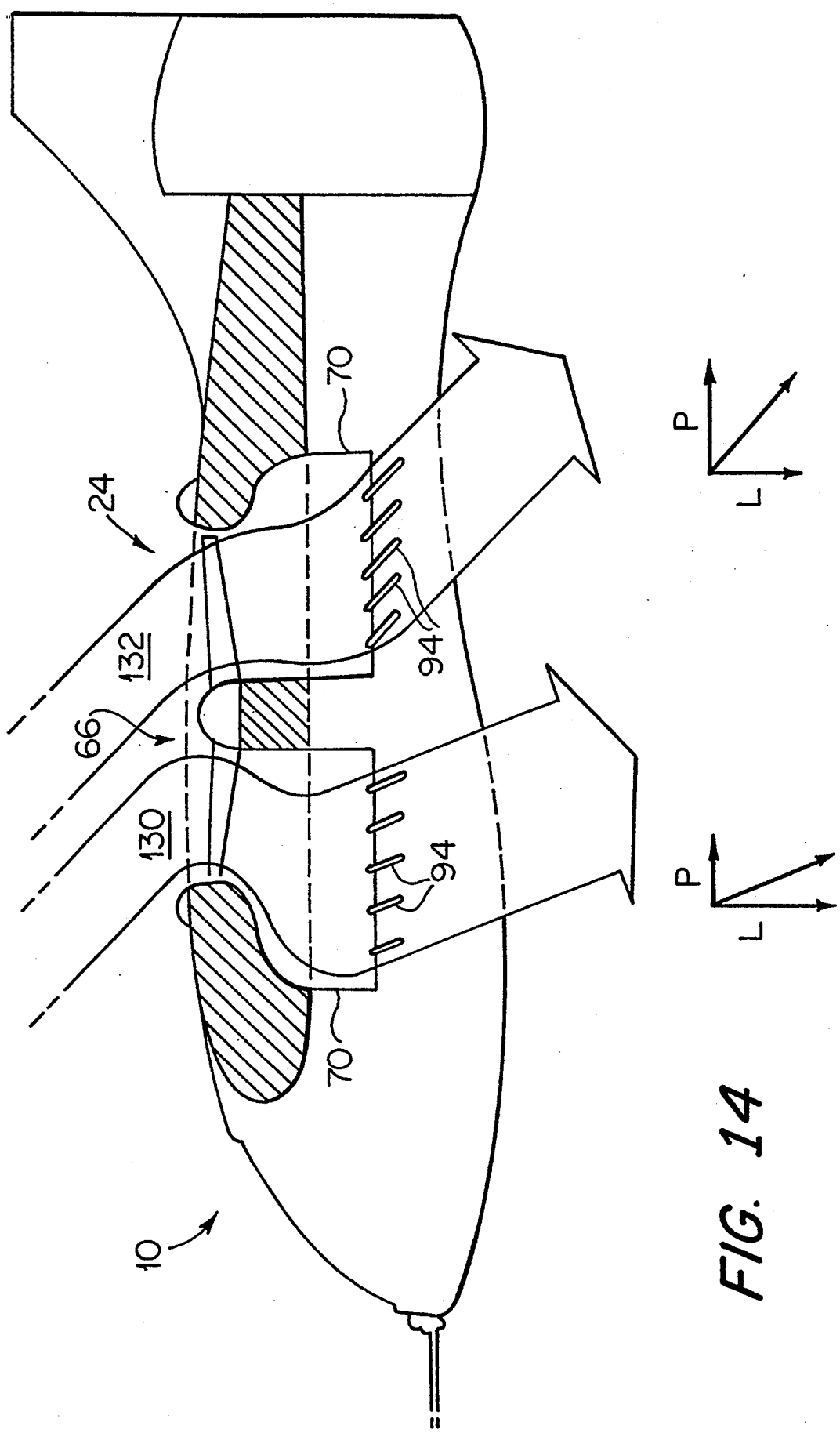
FIG. 14 is a schematic side view of the VTOL aircraft of FIG. 1 showing hypothetical air paths when the VTOL aircraft is in "transition mode"

In designing the lift unit 24 it is important that consideration be given to the effect of air flowing into the lift fan 66 at an angle. Hypothetical paths for air flowing through the lift unit 24 are shown in FIG. 14, in which the VTOL aircraft 10 is in transition mode. The air will take the shortest path into the lift fan 66 and hence the air resistance for the air can be considered of a lesser value for entry into the front of the lift fan 66 and of a greater value for entry into the rear of the lift fan 66. In the event that the nett resistance of air flowing through each of the lift ducts 70 is equal, the air will then traverse a path through the forward most lift ducts 70 in preference to the rear most lift ducts 70. This will have the effect of tending to cause a nose up condition as the aircraft 10 is in the transition mode. Such a condition must be avoided since it leads to a slow down in the forward speed of the VTOL aircraft 10 which tends to prevent the VTOL aircraft 10 from developing sufficient forward speed to reach the forward flight mode.

The solution to this problem is to orient the lift ducts 70 so that the air which enters the forward most lift ducts 70 experiences a greater air resistance than if it entered the rear most ducts 70. This is shown pictorially in FIG. 14 by the more tortuous path undertaken by the air on path 130 as compared to path 132. The differences in path for the air represent a different resistance of the forward most lift ducts 70 compared to the rear most ducts 70. Such difference in air resistance is achieved by directing the forward most ducts 70 partly in the direction of forward flight and by directing the rear most ducts 70 partly in a direction opposite to the direction of forward flight, particularly as shown in FIGS. 5 an 8. The nett result of this is that the air resistance for air entering, traversing and exhausting from the forward most lift ducts 70 is substantially equal to the air resistance for air entering, traversing and exhausting from the rear most lift ducts 70. Hence, the nose-up tendency is counteracted.

Also, as shown in FIG. 14 the exhaust deflecting vanes 94 of the forward and rearward lift ducts 70 may be angled differently to give differing amounts of lift (L) and propulsion (P) to produce differing amounts of thrust (T) at differing angles (A). This may also be used to assist in overcoming nose-up tendency.

Figure 15:
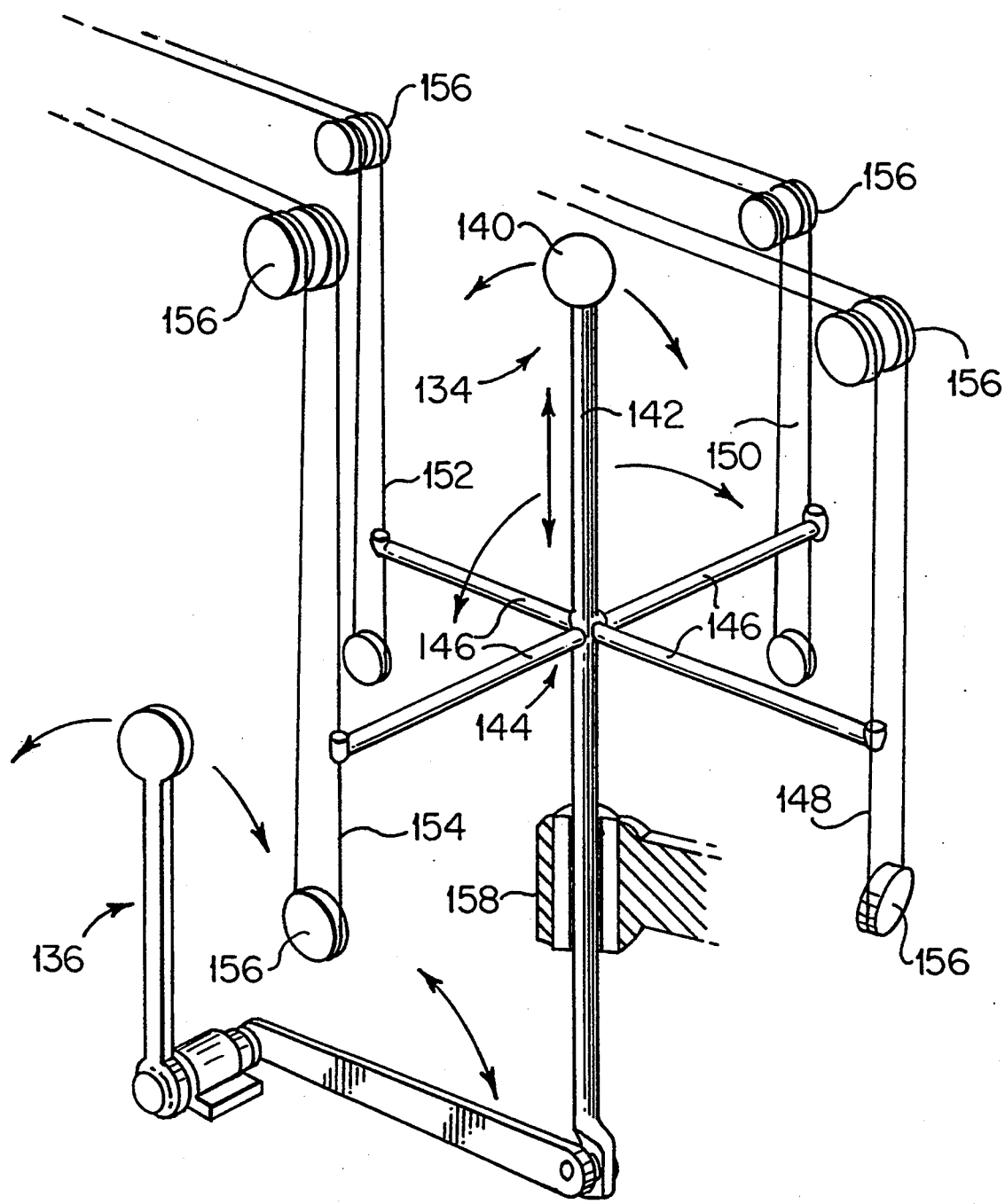
FIG. 15 is a schematic perspective view, seen from above of a joy stick and thrust control lever for the lift unit.
Figure 16:
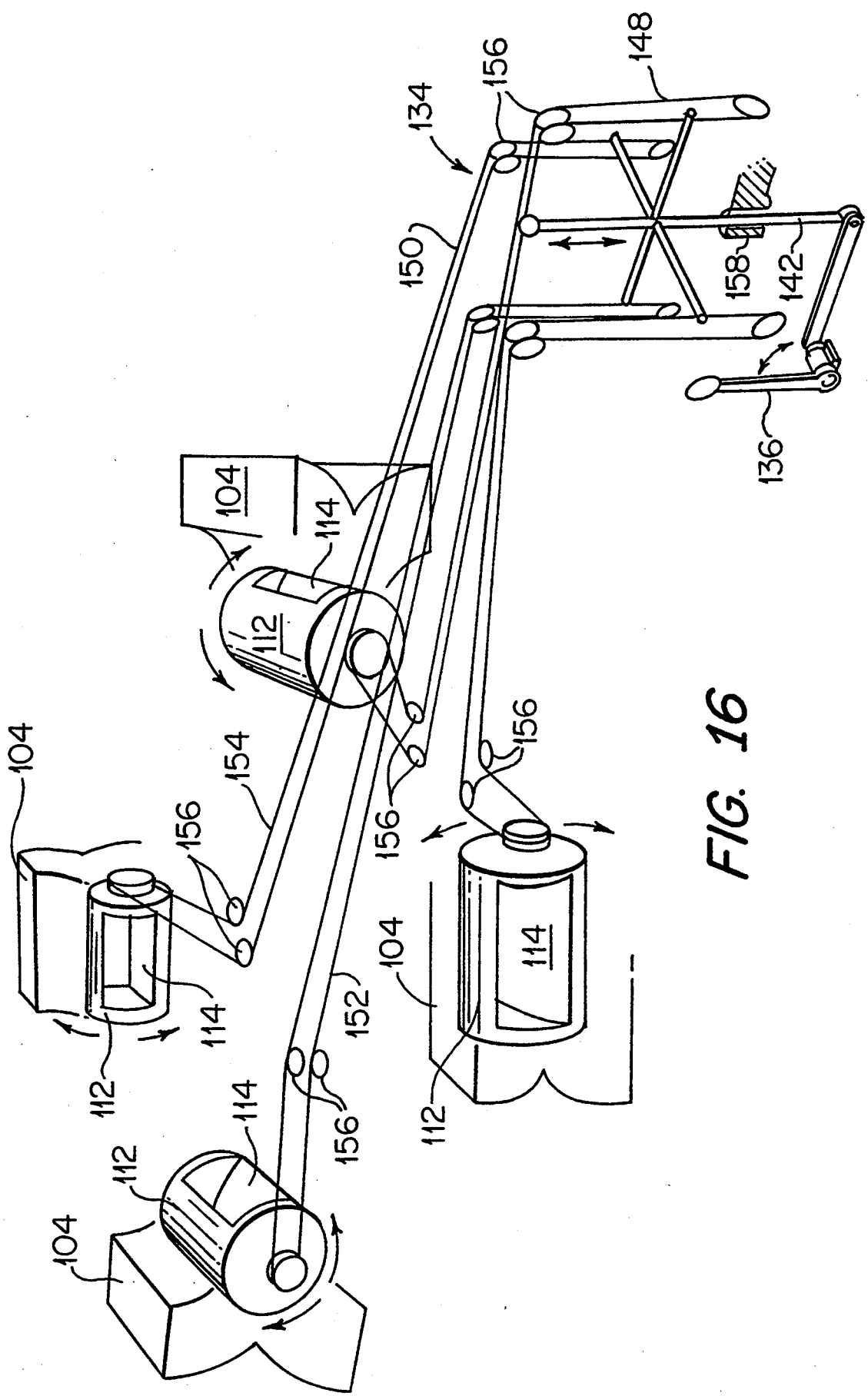
FIG. 16 is a schematic perspective view, seen from above, of the joy stick and thrust lever, shown attached to rotary splitters of each of the lift unit.

In FIGS. 15 and 16 there is shown a joy stick 134 and a thrust control lever 136 for controlling the angle of orientation of the rotary splitters 112 of each of the control ducts shown in FIGS. 11 or 12. For this purpose the rotary splitters 112 have a lever 138 fixed at one end (see FIG. 12). The joy stick 134 has a knob 140 located atop a shaft 142 having a cross tree 144 located intermediate its length. The cross tree 144 has four arms 146 attached to respective cables 148, 150, 152 and 154. Each of the cables 148 to 154 is run through a series of pulleys 156 and connected to the levers 138 (FIG. 12) or otherwise to the respective rotary splitters 112 (FIG. 16). The shaft 142 is disposed in a mounting 158, which allows for both axial and pivotal movement of the shaft 142. Axial movement results in the raising and lowering of the cross tree 144, whereas pivotal movement results in pivoting of two or more of the arms 146 of the cross tree 144. Consequently, the joy stick 134 may be moved in order to control the flow of air in two or more of the control ducts 72. The thrust control lever 136 is coupled to a lower end of the shaft 142 so that pivotal movement of the thrust control lever 134 results in axial displacement of the shaft 142 and hence simultaneous movement of the ends of each of the arms 146 of the cross tree 144 and thus equal rotation of each of the rotary splitters 112. The thrust control lever 126 is thus capable of providing a thrust control offset.

Preferably, the arms of the joy stick are also operatively connected to the elevators 16 and ailerons 18 so as to effect control over the lift surfaces of the VTOL aircraft 10, equal to the control effected over the lift unit 24. Such control is important in achieving smooth transition into and out of forward flight mode.

The joy stick 134 provides yaw, pitch and roll control, whereas the thrust control lever 134 provides a thrust control for a given speed of operation of the engine 48.

We have discovered that once tilted the aircraft 10 does not automatically right itself, especially when close to the ground (where we expect that ground effect increases the resistance of the lift ducts 70 closest to the ground). To alleviate this problem counter weights could be attached to the joystick 134 to pivot under the force of gravity to automatically urge the joystick 134 in a direction to counteract the tilt of the aircraft 10.

As shown in FIG. 1, the propulsion unit 26 is typically in the form of a conventional propulsion fan 160 located in a duct 162, the axis of the fan 160 and the duct 162 being arranged substantially horizontally. Typically, the propulsion fan 160 has three blades 164, each having a relatively course pitch. Preferably, the propulsion fan 160 is of a relatively high air speed for propelling the VTOL aircraft 10 at substantial speed through the air. Preferably, the length of the duct 162 is approximately equal to or greater than the diameter of the propulsion fan 160. The propulsion fan 160 is connected to the drive shaft 164.

It is preferable in the interest of smooth transition from vertical flight mode to forward flight mode that the lift unit 24 and propulsion unit 26 be so matched that the thrust provided by the propulsion unit 26 is substantially equal to the forward thrust provided by the lift unit 24 at the transition speed. In this regard, it is to be noted that since the lift duct louvres 44 are angled backwardly (see FIG. 14) they reduce the effective cross-sectional area of the lift ducts 70 which reduces the effective operational area of the lift unit 24. Ideally the transition to forward flight mode occurs when the effective cross-sectional area of the lift unit 24 is substantially equal to the cross-sectional area of the propulsion unit 26.

The thrust unit described hereinabove can be located in aircraft 10a to 10d having various wing design arrangements as shown in FIGS. 17a to 17d. The VTOL aircraft 10a of FIG. 17a represents a 4-6 seat business or personnel aircraft, the VTOL aircraft 10b of FIG. 17b represents a 62-80 seat inter city commuter aircraft, the VTOL aircraft 10c of FIG. 17c represents a stealth type bomber and the VTOL aircraft 10d of FIG. 17d represents an unmanned aerial vehicle (UAV).

Figure 18:
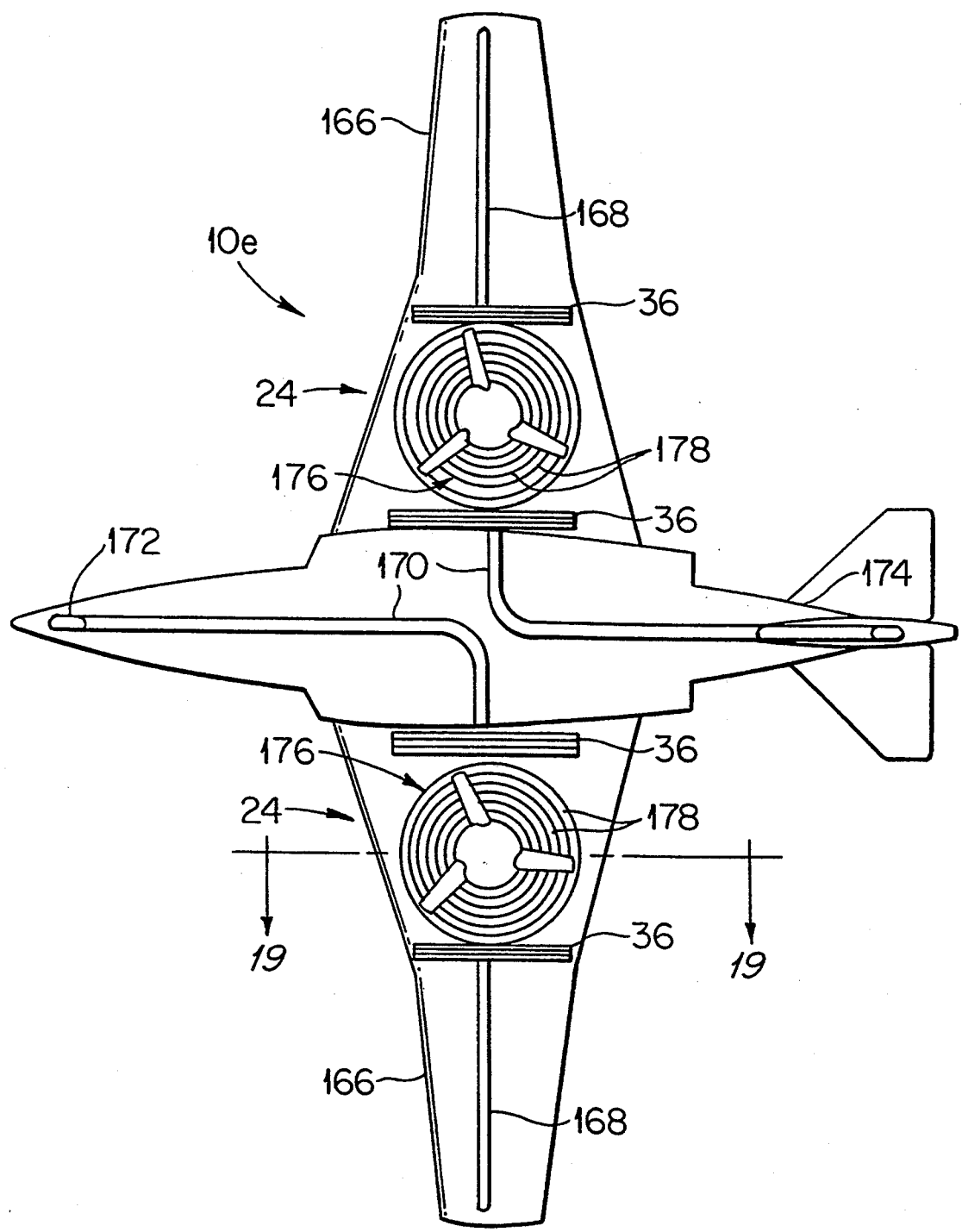
FIG. 18 is a plan view of a VTOL aircraft having the lift unit located in its wings.
Figure 19:
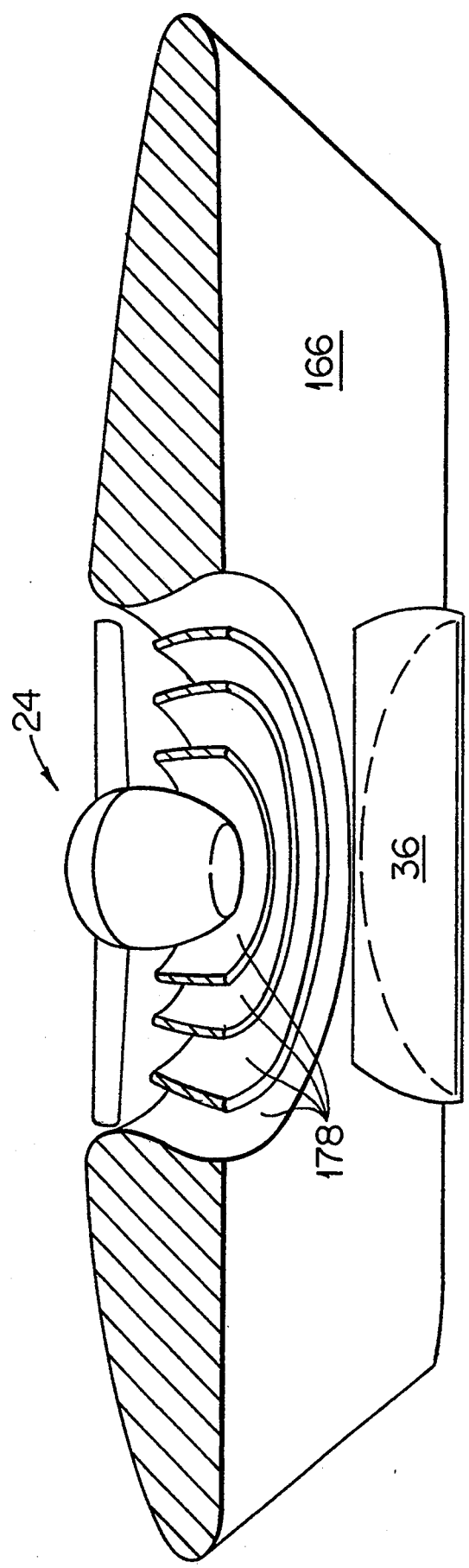
FIG. 19 is a cross-sectional view taken on line 19—19 of one of the wings of the VTOL aircraft of FIG. 18.
Figure 20A:
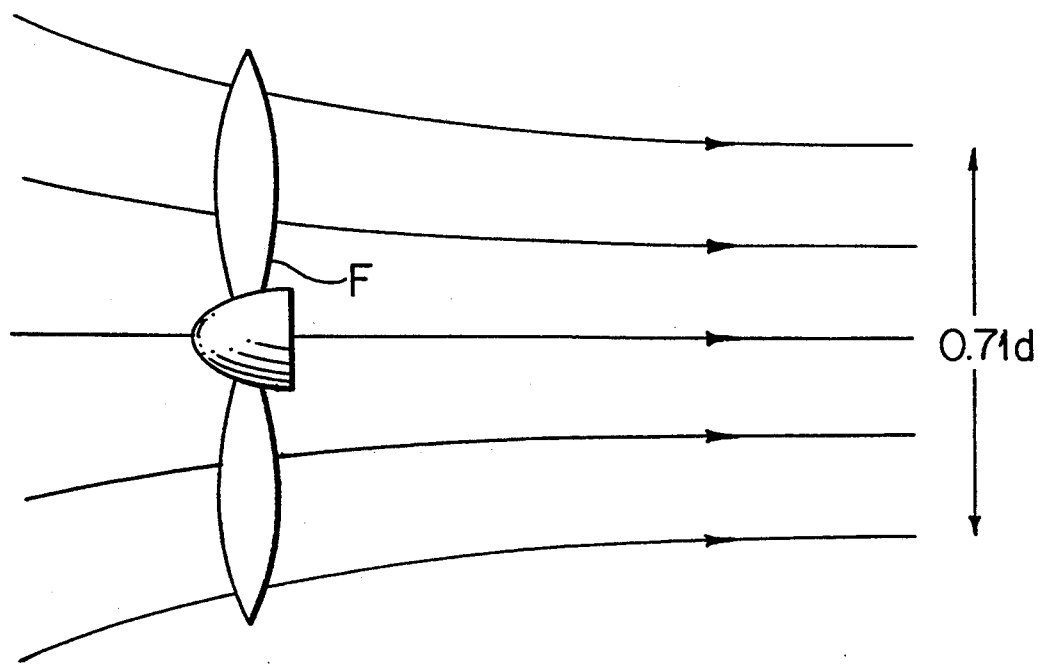
FIGS. 20a, 21a and 22a are schematic diagrams showing air flow passed fans, being an open fan, a ducted fan, and a ducted fan according to one embodiment of the present invention, respectively; and, FIGS. 20b, 21b and 22b are pressure energy distributions corresponding to the arrangements of FIGS. 20a, 21a and 22a, respectively.
Figure 20B:
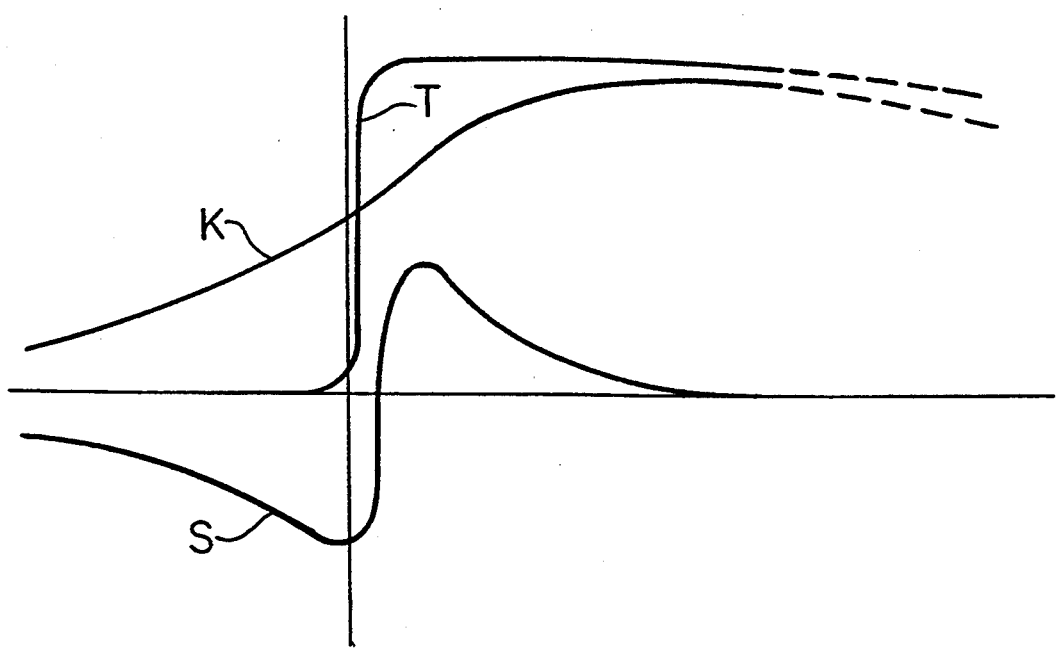
Figure 21A:
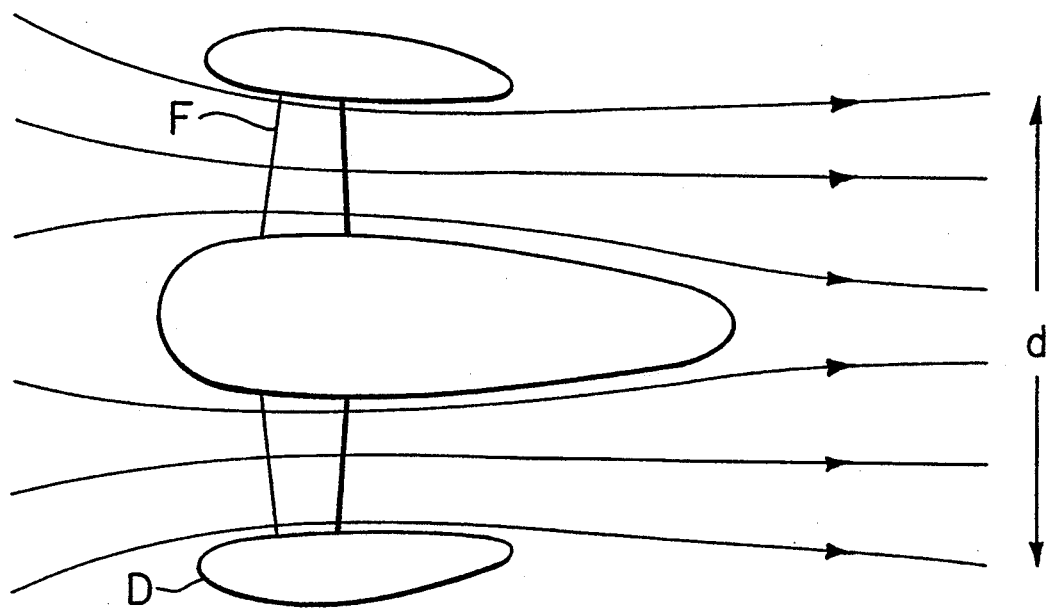
Figure 21B:
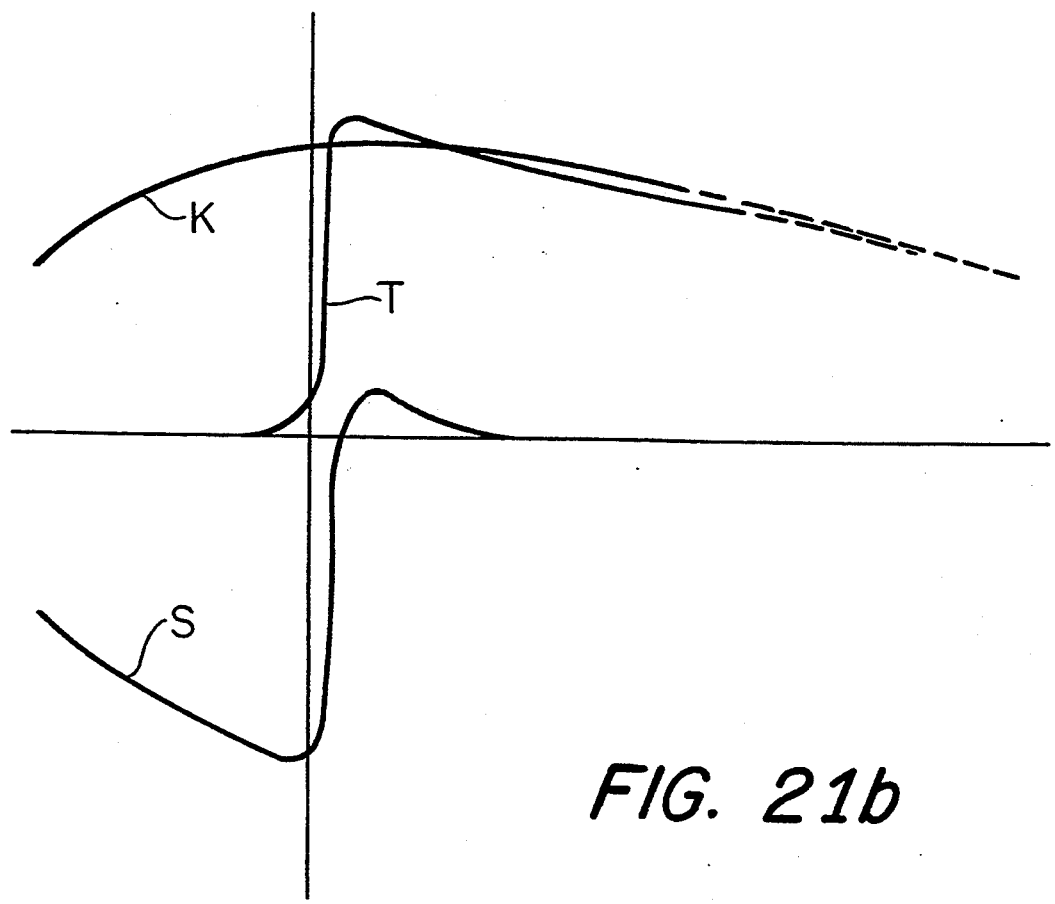
Figure 22A:
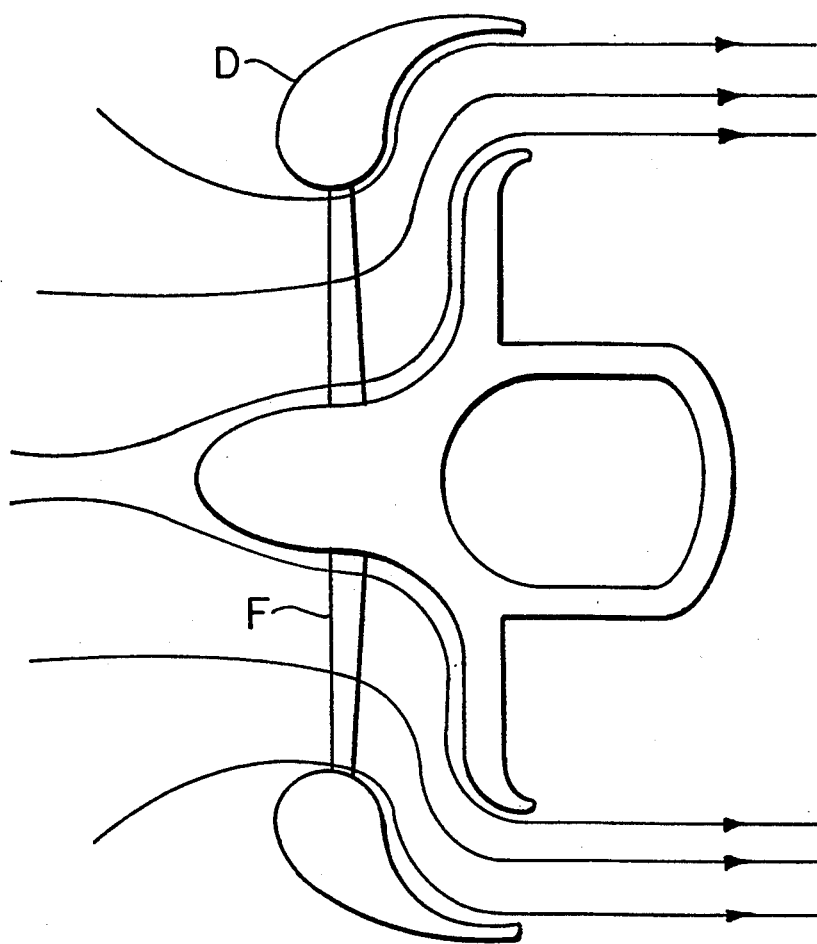
Figure 22B:
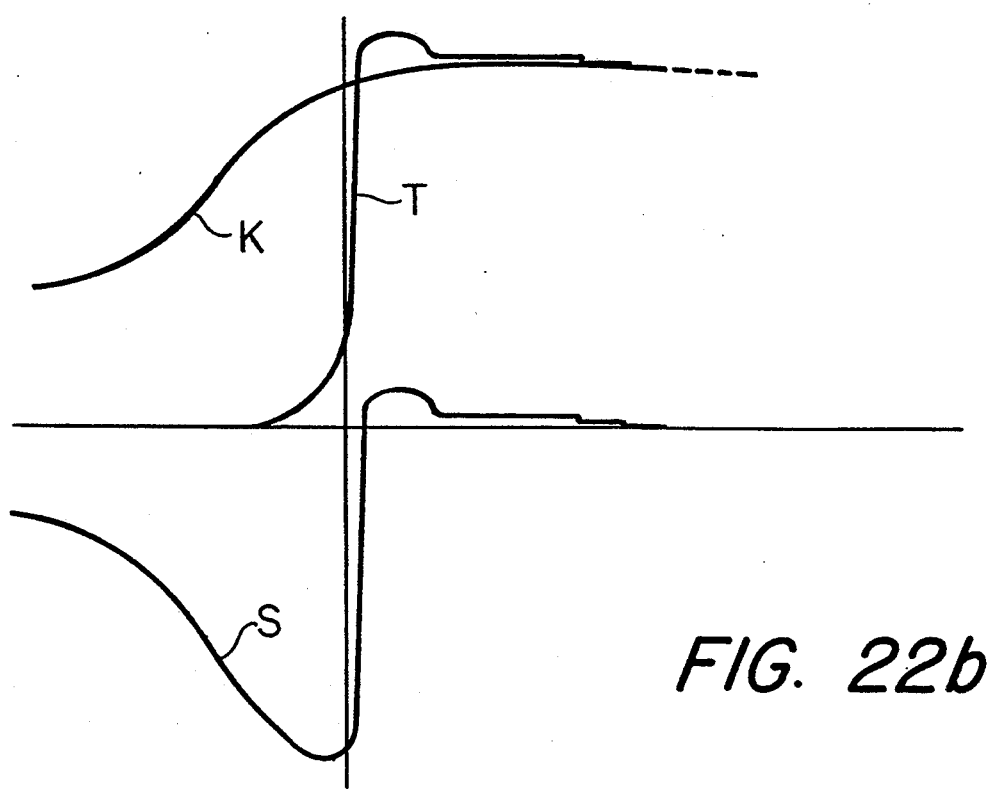

In FIG. 18 there is shown a VTOL aircraft 10e having lift unit 24 located in its wings 166. The lift unit 24 each have two control ducts 168 and 170 extending from opposite sides of the lift unit 24. The control ducts 168 extend toward tips of the wings 166 and the control ducts 170 are directed towards a nose 172 and tail 174 of the VTOL aircraft 10. The lift units 24 each have a lift duct 176 formed of a plurality of concentric subducts 178 (see also FIG. 19). Preferably, the air resistance of the subducts 178 is substantially the same as the air resistance of the control ducts 168 and 170. Alternatively, fans could be located in the ducts 168 and 170 for controlling air flow therein. Typically, each of the lift ducts 176 has a plurality of exhaust deflecting vanes (not shown), corresponding in number to the number of concentric subducts 178.

The VTOL aircraft 10 also has a foot operated control operatively connected to the exhausting deflecting vanes 94 for controlling the angle of the exhaust deflecting vanes 94 for achieving yaw, pitch and roll control, as well as propulsion control when in the transition mode. The foot operated control may be pivotable for differential control of the exhaust deflecting vanes 94 of respective lift ducts 70 and displaceable for simultaneous control of all of the exhaust deflecting vanes 94 of all of the lift ducts 70. Differential control preferably includes directing port and starboard exhaust deflecting vanes 94 in opposite directions for yaw control; directing front and rear exhaust deflecting vanes 94 at differing angles, although typically in the same direction for pitch control; and directing port and starboard exhaust deflecting vanes 94 at differing angles in the same direction for roll control. Preferably, the exhaust deflecting vanes 94 can also all be directed simultaneously forwardly for affecting breaking from forward flight mode to vertical flight mode.

The aircraft 10 may also have a retractable web located in leading edge of the delta wing 12 and moveable to the canard wing 14 for increasing the effective wing area when in unpowered descent. The web has the effect of moving the centre of lift of the delta wing 12 forward to the centre of gravity of the aircraft, when in unpowered vertical descent. Cables may be provided from the delta wing 12 to the canard wing 14 to carry the web. Without the web the nose of the aircraft 10 tends to tilt down and develops forward momentum. An exploding air bag could also be provided beneath the fuselage for absorbing some of the impact as the aircraft 10 hits the ground.

In use, the VTOL aircraft 10 can be flown in a vertical flying mode, a transition mode, and a forward flight mode. Assuming the VTOL aircraft 10 is parked on the ground it may enter into the vertical flying mode by the following steps. Firstly, the gull wing louvres 36 are opened to reveal the lift fan 66. The engine 48 is started and coupled to the lift fan 66 by the clutch 54 to cause rotation of the lift fan 66. Such rotation draws air downwardly through the lift ducts 70 passed the exhaust deflecting vanes 94 and exhausts out via the outlets 85b. The speed of the engine 48 is increased to increase the lift developed by the lift ducts 70 until the VTOL aircraft 10 lifts off the ground. Further increases in the speed of the lift fan 66 result in vertical acceleration of the VTOL aircraft 10. Whilst in vertical flight mode yaw, pitch and roll control can be provided by pivotal movement of the joy stick 134 for angularly rotating the rotary splitters 112 of the control ducts 72 for producing differing amounts of downward force on the aircraft 10 via the control ducts 72 and/or by varying the amount of vertical lift through each of the lift ducts 70. Also, when the VTOL aircraft 10 is at a fixed altitude such pivotal movement of the joy stick 134 achieves flight in a hover mode in the horizontal plane of the VTOL aircraft 10. Variation in the thrust provided by the lift unit 24 can be effected either by varying the speed of the engine 48 or by axially displacing the joy stick 134, with the thrust lever 136, for simultaneously rotating the rotary splitters 112 in order to vary the flow of air in all of the control ducts 72. Alternatively, the foot operated controller can be actuated to vary the angle of the exhaust deflecting vanes 94 to effect similar control by varying the angle at which the thrust of the lift ducts 70 is directed.

Flight in the transition mode is effected by directing all of the exhaust deflecting vanes 94 rearwardly, for example, as shown in FIG. 14, for providing a component of forward propulsion (P) together with a component of lift (L). The lift overcomes the force of the weight of the aircraft 10 and the propulsion produces forward flight. In order to be able to achieve transition to forward flight mode it is preferable that the speed of the air through the lift duct 70 be at least twice the minimum forward propulsion speed of the VTOL aircraft 10 required for the forward flight mode. For example, if the forward flight speed required is 22 meter per second, preferably, the lift duct 70 air speed is about 44 meters per second. Also, it is preferred that at the transition speed the engine 48 has a power surplus of approximately 50% or more. It is to be noted that as the exhaust deflecting vanes 94 are directed more rearwardly the effective cross-sectional are of the lift unit 24 decreases and the speed of the air exhausting from the outlet 92 of the lift ducts 70 increases. This increase in air exhaust speed serves to assist in accelerating the VTOL aircraft 10 towards the transition speed. At the transition speed the delta wing 12 and the canard wing 14 provide sufficient lift to support the weight of the VTOL aircraft 10. At this speed the clutch 56 engages to rotate the propulsion fan 160 of the propulsion unit 26. The propulsion fan 160 is designed to maintain the forward thrust provided by the lift fan 66 at this speed. As the engine 48 increases in speed the clutch 54 is disengaged so as to cease driving the lift van 66.

Completion of the transition to the forward flight mode is achieved by closing the gull wing louvres 36, retracting the cowling 80 into the fan chamber 68, closing the control duct louvres 40, retracting the outlets 85b into the lift ducts 70 and closing the lift duct louvres 44 so as to provide a streamline surface over the delta wing 12.

Since the joy stick 134 is capable of controlling the elevators 16 and the ailerons 18 an operator of the VTOL aircraft 10 can control flight of the aircraft in the same manner irrespective of whether the aircraft is in the vertical flight mode, transition mode or forward flight mode. In the forward flight mode the elevators 16 and ailerons 18 provide yaw, pitch and roll control whilst the speed of the engine is varied to control the propulsion provided by the propulsion fan 160. Control of the ailerons 18 is provided by foot operated pedal sin conventional manner.

The reverse procedure may be employed in order to control the VTOL aircraft 10 from the forward flight mode through the transition mode to the vertical flight mode for landing the VTOL aircraft 10. However, in the transition mode the exhaust deflecting vanes 94 are directed forwardly.

It can be seen from the above that the VTOL aircraft 10 of the present invention can be flown in both vertical and forward flight modes and in which transition between these two modes occurs relatively efficiently with a relatively high degree of control. The disposition of the lift ducts 70 in the lift unit 24 overcomes the problem of nose up tendency which otherwise occurs in lift fans having their axis of rotation disposed vertically in a lift surface. The lift unit 24 of the present invention has the surprising effect that each of the lift ducts 70 has equal air resistance in the vertical flight mode and unequal air resistance in the transition mode. The disposition of the lift ducts 70 and the provision of the cowling 80 is important in determining the difference in the duct resistance of the forward most duct 70 as compared to the rear most ducts 70.

The control ducts 72 have the advantage that some of the air from the lift unit 24 can be used to force a part of the delta wing 12 downwardly. This provides a fine control over the attitude of the delta wing 12. Since the resistance of the control ducts 72 and 70 is the same, in most of the embodiments, the mass of air passing through the lift duct 24 is constant regardless of the amount of vertical lift produced. The four lift ducts 70 have the further advantage that they remove the reaction torque from the air produced by the lift fan 66 and hence a tail rotor is not required and the energy recovered from removing the swirl provides for greater thrust. Also, the use of four lift ducts 70 produces an effect of four feet when the VTOL aircraft 10 comes into ground effect. The four foot effect is particularly stable and much preferable to a single stream of air providing lift as is the case in helicopters. Also, the deflecting of the air outwardly by the lift ducts 70 allows stationing of a relatively large fuselage 28 underneath the delta wing 12. Also, deflecting of the air enables the VTOL aircraft 10 to have a relatively thin frontal wing profile whilst at the same time providing lift ducts 70 and control ducts 72 of sufficient length to operate very efficiently. Consequently, hover and forward flight is possible without changing the configuration of the lift unit 24.

Having the centre of gravity well below the centre of lift results in a more stable aircraft in hover and forward flight. Also, the relative position of the centres of gravity and lift, where the web is in position between the delta wing 12 and the canard wing 14, has the effect that the VTOL aircraft remains substantially horizontal in an emergency vertical power off condition so as to produce relatively controlled descent. Also, due to the relatively large size of the delta wing 12 the rate of descent is relatively slow so as to increase the changes of survival in the event of a crash landing. Due to the control provided over the exhaust deflecting vanes 94 the VTOL aircraft 10 can be decelerated very rapidly from forward flight mode to vertical flight mode. For example, deceleration forces of the order of 10 ms$^{-2}$ are achievable which result in braking from one hundred kilometers per hour to hover in three to four seconds over a distance of approximately thirty five meters.

Such deceleration is comparable to the deceleration of a motor vehicle.

Also, when in the hover mode the VTOL aircraft 10 is capable of moderate speeds of rearward flight by using the lift unit 24. By the use of the separate propulsion unit 26 the maximum speed of the VTOL aircraft 10 is not limited by stalling of an advancing rotor or blade of a vertical axis fan, and hence the VTOL aircraft 10 is capable of speeds well in excess of two hundred and fifty kilometers per hour—which is the limit for helicopters.

Modifications and variations such as would be apparent to a skilled addressee are deemed within the scope of the present invention. For example, other mechanism could be used to control the rotary splitters for controlling the attitude of the aircraft 10, especially in vertical fight. The propulsion unit 26 could be other than a fan, such as, for example, a jet engine. The gull wind louvres 36 could be replaced by panels which retract into the delta wing 12. Also, the aircraft 10 of the present invention can also be used as an STOL aircraft—in which case it can carry much greater pay loads due to the delta wing 12 configuration.

I claim:

1. A VTOL aircraft comprising:
   an airframe;
   a thrust unit located within the airframe for propelling the VTOL aircraft in a vertical flight mode and a transition flight mode between vertical flight and horizontal flight, the thrust unit having;
   a) a duct including:
   an inlet disposed substantially vertically upwardly on an upper surface of the airframe for allowing air into the duct, the inlet having means for inhibiting separation of the air from an outer lip of the inlet for improving the efficiency of operation of the duct,
   a chamber located below the inlet, and
   a plurality of sub-ducts, each sub-duct being curved outwardly and downwardly from the chamber to a respective outlet, each outlet being disposed substantially vertically downwardly on a lower surface of the airframe for exhausting air out of the duct in a substantially downward direction for providing positive lift, the sub-ducts having a width dimension which is critical to the flow of air therethrough, the critical width dimension being less than a length of a path which air takes through the sub-duct so that air exhausting from each of the outlets is substantially non-convergent, the outlets being spaced apart and located below and outside a vertical profile of the inlet so as to render the VTOL aircraft easier to control, an average width of a vertical profile of the outlets measured at the extremities thereof being greater than a vertical distance between the inlet and the outlets so as to reduce a frontal area of the airframe for reducing the drag of the VTOL aircraft in the horizontal plane,
   an air pump for inducing a draft of air through the duct, the air pump being located in the chamber, the air pump operating on a substantially vertical axis; and
   control means for controlling the lift force and the attitude of the VTOL aircraft.

2. A VTOL aircraft comprising:
   an airframe;
   a thrust unit located within the airframe for propelling the VTOL aircraft in a vertical flight mode and a transition flight mode between vertical flight and horizontal flight, the thrust unit having;
   a) a duct including
   an inlet disposed substantially vertically upwardly on an upper surface of the airframe for allowing air into the duct, the inlet having means for inhibiting separation of the air from an outer lip of the inlet for improving the efficiency of operation of the duct,
   a chamber located below the inlet,
   a plurality of sub-ducts each sub-duct being curved outwardly and downwardly from the chamber to a respective outlet, some of the outlets being disposed substantially vertically downwardly on a lower surface of the airframe for exhausting air out of the duct in a substantially downward direction for providing positive lift, and the remainder of the outlets being disposed substantially vertically upwardly on the upper surface of the airframe for exhausting air out of the duct in a substantially upward direction for providing negative lift, the sub-ducts each having a width dimension which is critical to the flow of air therethrough, the critical width dimension being less than a length of a path which air takes through the sub-duct so that air exhausting from each of the outlets in substantially non-convergent, the outlets being spaced apart and located below and outside a vertical profile of the inlet so as to render the VTOL aircraft easier to control, an average width of a vertical profile of the outlets measured at the extremities thereof being greater than a vertical distance between the inlet and the outlets so as to reduce a frontal area of the airframe for reducing the drag of the VTOL aircraft in the horizontal plane,
   the sub-ducts including
   i. a plurality of lift sub-ducts each having one of the outlets disposed downwardly on the lower surface of the airframe for providing positive lift, and
   ii. a plurality of control sub-ducts each having a lift dump sub-duct with one of the outlets located on the upper surface of the airframe for providing negative lift, and a lift enhancement sub-ducts with one of the outlets located on the lower surface of the airframe for enhancing lift, and
   air flow direction control means located upstream of the outlets of the control sub-ducts for controlling the proportion of the air in the lift dump sub-ducts and the lift enhancement sub-ducts, for controlling the lift and the attitude of the VTOL aircraft; and
   b) an air pump for inducing a draft of air through the duct, the air pump being located in the chamber and operating on a substantially vertical axis; and,
   control means for controlling the lift force and the attitude of the VTOL aircraft;
   wherein, the mass of air flowing through the duct is substantially the same irrespective of the proportion of air exhausting through the outlets located on the upper surface of the airframe as compared to the proportion of air exhausting through the outlets located on the lower surface of the airframe.

3. A VTOL aircraft according to claim 2, in which the air pump is an axial flow fan having a plurality of blades each of which is disposed upstream from the sub-ducts for pumping air downwardly into the sub-ducts.

4. A VTOL aircraft according to claim 3 in which the blades are elevated with respect to the horizontal plane at an angle such that a resultant of the forces of lift generated by the blade and centrifugal forces caused by rotation of the axial flow fan act along a length of each of the blades so as to substantially remove bending moments which otherwise occur at a base of each of the blades.

5. A VTOL aircraft according to claim 3, in which a center of lift of each of the blades coincides with a center of mass of each of the blades for reducing twisting moments in the blades.

6. A VTOL aircraft according to claim 2, wherein the control means controls the direction of the flow of air out of the sub-ducts, the control means allowing the mass of air flowing through the duct to be substantially the same irrespective of the paths that the air flow takes from the inlet to the outlets.

7. A VTOL aircraft according to claim 6, in which the air frame includes a wing, the wing having a lift moment taken about a center of gravity thereof which is substantially constant in both the vertical flight mode and the transition flight mode so that the center of lift is substantially constant in the vertical flight mode and the transition flight mode.

8. A VTOL aircraft according to claim 6, in which the air frame includes a wing, the wing having a lift moment taken about a center of gravity thereof which is substantially constant in both the vertical flight mode and the transition flight mode so that the center of lift is substantially constant in the vertical flight mode and the transition flight mode, and the air frame also having a payload compartment located substantially vertically below the air pump.

9. A VTOL aircraft according to claim 6, in which the air frame includes a wing, the wing having a lift moment taken about a center of gravity thereof which is substantially constant in both the vertical flight mode and the transition flight mode so that the center of lift is substantially constant in the vertical flight mode and the transition flight mode, the air frame also having a payload compartment located substantially vertically below the air pump, the wing having a plurality of doors for closing off the inlet and the outlets, and the VTOL aircraft also having a propulsion unit for propelling the VTOL aircraft in a forward flight mode.

10. A VTOL aircraft according to claim 6, in which the air frame includes a wing, the wing having a lift moment taken about a center of gravity thereof which is substantially constant in both the vertical flight mode and the transition flight mode so that the center of lift is substantially constant in the vertical flight mode and the transition flight mode, the wing having a plurality of doors for closing off the inlet and the outlets and the VTOL aircraft also having a propulsion unit for propelling the VTOL aircraft in a forward flight mode.

11. A VTOL aircraft according to claim 6, in which the air frame includes a wing, the wing having a lift moment taken about a center of gravity thereof which is substantially constant in both the vertical flight mode and the transition flight mode so that the center of the lift is substantially constant in the vertical flight mode and the transition flight mode, the air frame also having a payload compartment located substantially vertically below the air pump, the wing having a plurality of doors for closing off the inlet and the outlets, the VTOL aircraft also having a propulsion unit for propelling the VTOL aircraft in a forward flight mode, the propulsion unit being a substantially horizontal axis fan located in a duct for rendering air exhausting from the horizontal axis fan substantially non-convergent.

12. A VTOL aircraft according to claim 6, in which the air frame includes a wing, the wing having a lift moment taken about a center of gravity thereof which is substantially constant in both the vertical flight mode and the transition flight mode so that the center of lift is substantially constant in the vertical flight mode and the transition flight mode, the air frame also having a payload compartment located substantially vertically below the air pump, the wing having a plurality of doors for closing off the inlet and the outlets, the VTOL aircraft also having a propulsion unit for propelling the VTOL aircraft in a forward flight mode, and the control means being capable of progressively reducing the lift generated by the thrust unit and increasing the lift generated by the propulsion unit and the wing during the transition flight mode.

13. A VTOL aircraft according to claim 2, in which the lift sub-duct outlets located on the lower surface of the airframe each having a plurality of exhaust deflector vanes, each exhaust deflector vane being disposed at an angle which is less than 45° to a direction of forward flight of the VTOL aircraft, the exhaust deflector vanes each being controllable by the control means for controlling the attitude of the VTOL aircraft by vectoring a major component of the thrust from the thrust unit in a direction for forward and rearward movement and a minor component of the thrust from the thrust unit in a direction for sideways movement.

14. A VTOL aircraft according to claim 2, in which the lift sub-duct outlets located on the lower surface of the airframe are each elongate, the outlets being disposed generally in a direction of forward flight of the VTOL aircraft, in combination the outlets defining a generally diamond shaped configuration.

15. A VTOL aircraft according to claim 14, in which the outlets each include a diffuser for recovery of static pressure.

16. A VTOL aircraft according to claim 2, in which the sub-ducts include forward sub-ducts and rearward sub-ducts, each of the lift sub-ducts being of substantially the same shape as each other so that the resistance to air passing through each of the lift sub-ducts when in a vertical flight mode is substantially the same, and each of the control sub-ducts being of the same shape as each other so that the resistance to air passing through each of the control sub-ducts when in the vertical flight mode is substantially the same, and in which the sub-ducts are oriented so that the forward sub-ducts have a greater resistance to air passing therethrough than the rearward sub-ducts when in the transition flight mode between vertical flight and horizontal flight, so that the forward sub-ducts can generate substantially the same amount of lift as the rearward sub-ducts in both the vertical flight mode and the transition mode.

17. A VTOL aircraft according to claim 16, in which the forward sub-ducts are disposed in a forward facing direction and the rearward sub-ducts are disposed in a rearward facing direction, the sub-ducts being shaped so that the path of air in the forward sub-ducts is more tortuous than the path of air in the rearward sub-ducts when the VTOL aircraft is in the transition flight mode, and in which the path of air in the forward sub-ducts is substantially the same as the path of air in the rearward sub-ducts when the VTOL aircraft is in the vertical flight mode.

18. A VTOL aircraft according to claim 16, in which the path of air through the duct from the inlet to each of the outlets is substantially S shaped when viewed in longitudinal section, each air path through the sub-ducts having two bends which are relatively closely spaced and well radiused, and the sub-ducts each having an outlet sub-duct portion for reducing resistance of the associated sub-duct.

19. A VTOL aircraft according to claim 16, in which the path of air through the duct from the inlet to each of the outlets is substantially S shaped when viewed in longitudinal section, each air path through the sub-ducts having two bends which are relatively closely spaced and well radiused, the sub-ducts each having an outlet sub-duct portion for reducing the resistance of the sub-duct, the sub-ducts each having air deflecting vanes located in the bends thereof for reducing separation of air from boundaries of the sub-ducts.

20. A VTOL aircraft according to claim 16, in which the chamber has an outlet disposed substantially radially outwardly with respect to the axis of the air pump, the chamber having a substantially bell shaped lower surface for deflecting air from the air pump outwardly to the sub-ducts for achieving smooth flow of the air from the inlet into the sub-ducts.

21. A VTOL aircraft according to claim 16, in which the chamber has an outlet disposed substantially radially outwardly with respect to the axis of the air pump, the chamber having a substantially bell shaped lower surface for deflecting air from the air pump outwardly to the sub-duct for achieving smooth flow of the air from the inlet into the sub-ducts, wherein the path of air through the duct from the inlet to each of the outlets is substantially S shaped when viewed in longitudinal section and the air paths each have two substantially 90° bends which are relatively closely spaced and well radiused, and the sub-ducts each having an outlet sub-duct portion for reducing the resistance of the sub-ducts.

22. A VTOL aircraft according to claim 16, in which the chamber has an outlet disposed substantially radially outwardly with respect to the axis of the air pump, the chamber having a substantially bell shaped lower surface for deflecting air from the air pump outwardly to the sub-ducts for achieving smooth flow of the air from the inlet into the sub-ducts, the chamber also having a cowling disposed upwardly from a peripheral edge thereof for increasing the efficiency of air intake into the duct, the cowling having a curved inner surface which tapers inwardly from an upper edge and then flares outwardly towards a lower edge.

23. A VTOL aircraft according to claim 2, in which the air flow direction control means is in the form of at least two diverter vanes stationed in the control sub-ducts for diverting the air therein in proportions between the lift dump sub-ducts and the lift enhancement sub-ducts.

24. A VTOL aircraft according to claim 2, in which the air flow direction control means is a single diverter van disposed for diverting the air in the control sub-ducts in proportions between the lift dump sub-ducts and the lift enhancement sub-ducts.

25. A VTOL aircraft according to claim 2, in which the airflow direction control means is in the form of a rotary splitter orientable between the lift dump sub-ducts and the lift enhancement sub-ducts.

26. A VTOL aircraft according to claim 2, in which the sub-ducts include forward sub-ducts and rearward sub-ducts, and in which the duct also includes resistance variation means for varying the resistance to the flow of air passing through the sub-ducts so that the sub-ducts have substantially equal resistance to air passing therethrough when in the vertical flight mode and so that the forward sub-ducts have a greater resistance to air passing therethrough than the rearward sub-ducts when in the transition flight mode between vertical flight and horizontal flight, the operation of the resistance variation means being such that the forward sub-ducts can generate substantially the same amount of lift as the rearward sub-ducts in both the vertical flight mode and the transition flight mode.

27. A thrust unit for a VTOL aircraft, the thrust unit having a lift unit for propelling the aircraft in upward flight, the lift unit operating at low pressure and high volume, the lift unit comprising:

a duct having a inlet and a chamber located below the inlet, the chamber being terminated at its lower end by a core and terminating at its outer periphery by an annular cylinder, the duct also having a plurality of spaced apart lift sub-ducts attached to the chamber at its outer periphery, each lift sub-duct being disposed outwardly and downwardly from the chamber for exhausting downwardly, the lift sub-ducts including forward lift sub-ducts disposed forwardly of the lift unit and rearward lift sub-ducts disposed rearwardly of the lift unit, the forward lift sub-ducts and the rearward lift sub-ducts having equal resistance to air passing through them when the aircraft is in a vertical flight mode, and in which the forward lift sub-ducts have a greater resistance to air passing therethrough than the rearward lift sub-ducts when the aircraft is in a transition flight mode, so that the forward lift sub-ducts and the rearward lift sub-ducts can provide substantially equal lift in both the vertical flight mode and the transition flight mode; and an air pump disposed for inducing a draft of air through each of the lift sub-ducts;

wherein the draft of air exhausting from each of the lift sub-ducts is substantially non-convergent and produces upward thrust.

28. A thrust unit according to claim 27, in which the forward lift sub-ducts are disposed in a forward facing direction and the rearward lift sub-ducts are disposed in a rearward facing direction, the lift sub-ducts being shaped so that the path of air in the forward lift sub-ducts is more tortuous than the path of air in the rearward lift sub-ducts when the aircraft is in the transition flight mode, and in which the path of air in the forward lift sub-duct is substantially the same as the path of air in the rearward lift sub-ducts when the VTOL aircraft is in the vertical flight mode.

29. A thrust unit according to claim 28, in which the path of air through the duct from the inlet to an outlet of each sub-duct is substantially S shaped when viewed in longitudinal section, each air path having two bends which are relatively closely spaced and well radiused, and the lift sub-ducts each having an outlet sub-duct portion for reducing the resistance of the associated sub-duct.

30. A thrust unit according to claim 28, in which the path of air through the duct from the inlet to an outlet of each sub-duct is substantially S shaped when viewed in longitudinal section, each air path having two bends which are relatively closely spaced and well radiused, and the lift sub-ducts each having an outlet sub-duct portion for reducing the resistance of the associated sub-duct, and in which each lift sub-duct has air deflecting vanes located in the bends for reducing separation of air from boundaries of the lift sub-ducts.

31. A thrust unit according to claim 28, in which the path of air through the duct from the inlet to an outlet of each sub-duct is substantially S shaped when viewed in longitudinal section, each air path having two bends which are relatively closely spaced and well radiused, and the lift sub-ducts each having an outlet sub-duct portion for reducing the resistance of the associated sub-duct, and in which each lift sub-duct has air deflecting vanes located in the bends for reducing separation of air from boundaries of the lift sub-ducts, and in which the lift sub-ducts also have diffusers located at the outlets thereof for recovery of static pressure.

32. A thrust unit according to claim 28, in which the lift sub-ducts have deflecting vanes located at the outlets thereof for controlling the direction of flow of air exhausting out of the outlets for controlling yaw, pitch, roll and lift of the VTOL aircraft and lateral and longitudinal movement of the VTOL aircraft.

33. A thrust unit according to claim 28, in which the lift unit also has a plurality of control sub-ducts each having a lift dump sub-duct with an outlet disposed upwardly for providing negative lift, a lift enhancement sub-duct with an outlet disposed downwardly for enhancing lift, and a valve means for supplying air to the sub-ducts and for proportioning air between outlets which exhaust upwardly and outlet which exhaust downwardly so as to direct some air upwardly for varying the lift produced by the lift unit.

34. A thrust unit according to claim 28, in which the lift unit also has a plurality of control sub-ducts for directing some air upwardly for varying the lift provided by the lift unit, the control sub-ducts and the lift sub-ducts being separate from each other and in which the control sub-ducts have upwardly and downwardly disposed outlets and a valve means for proportioning air from the air pump between the upwardly and the downwardly disposed outlets.

35. A thrust unit for a VTOL aircraft, the thrust unit having a lift unit for propelling the VTOL aircraft in upward flight, the lift unit comprising:
   a duct for directing air substantially downwardly, the duct having a chamber attached at an outer periphery thereof to a plurality of lift sub-ducts, and the duct also having a plurality of control sub-ducts, the lift sub-ducts exhausting substantially downwardly and the control sub-ducts being capable of exhausting substantially upwardly;
   an air pump disposed for including a draft of air through the lift sub-ducts and the control sub-ducts; and
   a valve means for controlling the draft of air through the control sub-ducts;
   wherein, the draft of air exhausting from the lift sub-ducts produces upward thrust and is substantially non-convergent and wherein the mass of air flowing through the lift unit is substantially independent of the operation of the valve means.

36. A thrust unit according to claim 35, in which the control sub-ducts and the lift sub-ducts are separate from each other, each of the control sub-ducts having an outlet exhausting upwardly and an outlet exhausting downwardly, each of the control sub-ducts also having a valve for proportioning the flow of air between the upwardly exhausting outlet and the downwardly exhausting outlet, wherein the mass of flow passing through the control ducts is substantially independent of the proportion of the air flowing out of the upwardly exhausting outlets and the downwardly exhausting outlets.

37. A thrust unit according to claim 36, in which each valve is a rotary splitter orientable between the upwardly exhausting outlets and the downwardly exhausting outlets of the associated control sub-duct.

38. A thrust unit according to claim 35, in which the control sub-ducts are formed integrally with the lift sub-ducts, and wherein the valve means proportions flow of air in the control sub-ducts between a maximum and a minimum, and wherein the mass of air flowing through the lift unit is substantially independent of the mass of air flowing through the sub-duct.

39. A thrust unit according to claim 35, in which the chamber has a cowling disposed upwardly from a peripheral edge thereof for increasing the efficiency of air intake into the duct, the cowling having a curved inner surface which tapers inwardly from an upper edge and then flares outwardly towards a lower edge.

40. A thrust unit according to claim 39, in which the air pump is an axial flow fan having a plurality of blades, each of the blades being elevated to the horizontal at an angle such that a resultant of the forces of lift generated by the blades and the centrifugal forces caused by rotation of the axial flow fan act along a length of each of the blades so as to substantially remove bending moments which otherwise would occur at a base of the blades.

41. A thrust unit according to claim 39, in which the axial flow fan has a plurality of blades, a center of lift of each of the blades coinciding with a center of mass of each of the blades for reducing twisting moments in the blades.

42. A thrust unit according to claim 35, and further including a propulsion unit disposed for producing forward propulsion of the VTOL aircraft.

43. A thrust unit according to claim 42, in which the propulsion unit is a horizontal axis fan located in a duct for rendering air exhausting from the horizontal axis fan substantially non-convergent.

44. A thrust unit according to claim 42, in which the lift unit is capable of propelling the VTOL aircraft in low speed forward flight, forward thrusts of the lift unit and the propulsion unit being controllable for progressively reducing the lift generated by the thrust unit and increasing the lift generated by the propulsion unit during the transition of the aircraft from vertical flight to horizontal flight.

* * * * *